US010049289B2

(12) United States Patent
Petkov et al.

(10) Patent No.: US 10,049,289 B2
(45) Date of Patent: *Aug. 14, 2018

(54) METHOD AND SYSTEM FOR GENERATING AND SELECTIVELY OUTPUTTING TWO TYPES OF INK VECTOR DATA

(71) Applicant: Wacom Co., Ltd., Saitama (JP)

(72) Inventors: Plamen Petkov, Sofia (BG); Branimir Angelov, Sofia (BG)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/391,483

(22) Filed: Dec. 27, 2016

(65) Prior Publication Data

US 2017/0236021 A1 Aug. 17, 2017

Related U.S. Application Data

(63) Continuation-in-part of application No. 15/043,300, filed on Feb. 12, 2016, now Pat. No. 9,792,517.

(51) Int. Cl.
*G06F 3/033* (2013.01)
*G06K 9/22* (2006.01)
(Continued)

(52) U.S. Cl.
CPC ......... *G06K 9/222* (2013.01); *G06F 3/03545* (2013.01); *G06F 3/04883* (2013.01); *G06K 9/00416* (2013.01); *G06T 11/203* (2013.01)

(58) Field of Classification Search
CPC ...... G06F 3/033; G06F 3/0346; G06F 3/0354; G06F 3/03545; G06F 3/038; G06F 3/041;
(Continued)

(56) References Cited

U.S. PATENT DOCUMENTS 5,157,737 A 10/1992 Sklarew
5,220,649 A * 6/1993 Forcier ................. G06F 3/0488
715/273
(Continued)

OTHER PUBLICATIONS

W3C, Recommendation 20, Sep. 2011, "Ink Markup Language (InkML)" (URL—http://www.w3.org/TR/2011/REC-InkML-20110920/), 49 pages.
(Continued)

*Primary Examiner* — Joe H Cheng
(74) *Attorney, Agent, or Firm* — Seed IP Law Group LLP

(57) ABSTRACT

A computer-implemented method selectively outputs two types of vector data representative of user-input strokes. Type one stroke objects are generated in a device including a position input sensor, on which a user operates a pointer to generate a type one stroke object representative of a stroke. A stroke starts at a pen-down time at which the pointer is placed on the position input sensor and ends at a pen-up time at which the pointer is removed therefrom. Real-time rendering of a type one stroke object is started after the pen-down time of a stroke without waiting for the pen-up time. After completion of a type one stroke object through its pen-up time, the type one stroke object is converted to a type two stroke object, which is a set of curves defining a boundary of the stroke, and can be exported as a file or rendered on a display.

20 Claims, 22 Drawing Sheets

(51) Int. Cl.
*G06F 3/0354* (2013.01)
*G06T 11/20* (2006.01)
*G06F 3/0488* (2013.01)
*G06K 9/00* (2006.01)

(58) Field of Classification Search
CPC .. G06F 3/0412; G06F 3/0488; G06F 3/04883; G06K 9/00416; G06K 9/00429; G06K 9/22; G06K 9/222; G06T 11/001; G06T 11/60; G06T 11/203
See application file for complete search history.

(56) References Cited

U.S. PATENT DOCUMENTS

| | | | |
|---|---|---|---|
| 5,231,698 A * | 7/1993 | Forcier | G06F 3/0488 345/179 |
| 5,539,427 A | 7/1996 | Bricklin et al. | |
| 5,613,019 A | 3/1997 | Altman et al. | |
| 5,698,822 A | 12/1997 | Haneda et al. | |
| 5,970,170 A | 10/1999 | Kadashevich et al. | |
| 5,991,441 A * | 11/1999 | Jourjine | G06K 9/00416 382/187 |
| 6,377,710 B1 | 4/2002 | Saund | |
| 6,502,114 B1 * | 12/2002 | Forcier | G06F 3/0488 715/273 |
| 7,551,312 B1 * | 6/2009 | Hull | G06K 15/02 358/1.15 |
| 9,025,879 B2 | 5/2015 | Sugiura | |
| 9,448,648 B2 | 9/2016 | Angelov et al. | |
| 2003/0179201 A1 * | 9/2003 | Thacker | G06F 3/0481 345/441 |
| 2007/0176893 A1 | 8/2007 | Sato | |
| 2007/0211061 A1 | 9/2007 | Kokojima | |
| 2011/0285724 A1 | 11/2011 | Kilgard | |
| 2011/0285742 A1 | 11/2011 | Kilgard et al. | |
| 2013/0314337 A1 * | 11/2013 | Asano | G06F 3/041 345/173 |
| 2014/0115543 A1 * | 4/2014 | Shimoni | G06F 3/04883 715/841 |
| 2016/0292500 A1 | 10/2016 | Angelov et al. | |

OTHER PUBLICATIONS

Microsoft Corporation, et al., "Ink Serialized Format Specification" 2007 (URL—http://download.microsoft.com/download/0/B/E/0BE8BDD7-E5E8-422A-ABFD-4342ED7AD886/InkSerializedFormat(ISF)Specification.pdf), 49 pages.

W3C Working Draft, Feb. 11, 2014, "Scalable Vector Graphics (SVG) 2" (URL—http://www.w3.org/TR/SVG2/); W3C Recommendation, Aug. 16, 2011, "Scalable Vector Graphics (SVG) 1.1 (Second Edition)" (URL—ttp://www.w3.org/TR/2011/REC-SVG11-201110816/), 102 pages.

W3C, "HTML5 A vocabulary and associated APIs for HTML and XHTML W3C Recommendation Oct. 28, 2014" (URL—http://www.w3.org/TR/html5/), 22 pages.

Slate Corporation, et al., "JOT—A Specification for an Ink Storage and Interchange Format", Version 1.0, Sep. 1996, 28 pages.

* cited by examiner (Simple Polygon)

(Curve fitted)

```
   . . .
00 x11a, y11a, color1 ⊘──── p1a ⎫
00 x12b, y12b, color1 ⊘──── p1b ⎪
00 x21a, y21a, color2 ○──── p2a ⎬ 1401
01 x22b, y22b, color2 ○──── p2b ⎭
01 x31a, y31a, color3
01 x32b, y32b, color3
   . . .
```

| $X_n$ | $Y_n$ | $W_n$ | |
|---|---|---|---|
| 129.4 | 215.6 | 1.1 | $n=0$ |
| 129.4 | 215.6 | 1.1 | $n=1$ |
| 129.4 | 215.6 | 1.1 | $n=2$ |
| 129.3 | 215.8 | 1.2 | $n=3$ |
| 129.2 | 216 | 1.3 | $n=4$ |
| 129.2 | 216.1 | 1.5 | $n=5$ |
| 129.6 | 215.9 | 1.6 | $n=6$ |
| 130.3 | 215.3 | 1.6 | $n=7$ |
| 131.2 | 214.3 | 1.7 | $n=8$ |
| 132.6 | 212.8 | 1.7 | $n=9$ |
| 134.2 | 211 | 1.7 | $n=10$ |
| 136.2 | 208.8 | 1.7 | $n=11$ |
| 138.5 | 206.4 | 1.7 | $n=12$ |
| 140.9 | 203.8 | 1.8 | $n=13$ |
| 143.5 | 201.1 | 1.8 | $n=14$ |
| 146.2 | 198.3 | 1.8 | $n=15$ |
| 149 | 195.5 | 1.8 | $n=16$ |
| 151.8 | 192.9 | 1.8 | $n=17$ |
| 154.7 | 190.4 | 1.9 | $n=18$ |
| 157.6 | 188.1 | 1.9 | $n=19$ |
| 160.6 | 185.9 | 1.9 | $n=20$ |
| 163.6 | 183.9 | 1.9 | $n=21$ |
| 166.6 | 182.1 | 1.9 | $n=22$ |
| 169.4 | 180.6 | 1.9 | $n=23$ |
| 172.1 | 179.4 | 1.9 | $n=24$ |
| 174.6 | 178.7 | 1.9 | $n=25$ |
| 176.9 | 178.3 | 1.9 | $n=26$ |

| $X_n$ | $Y_n$ | $W_n$ | |
|---|---|---|---|
| 179.1 | 178.4 | 2 | $n=27$ |
| 181.1 | 178.8 | 2 | $n=28$ |
| 183 | 179.9 | 2 | $n=29$ |
| 184.9 | 181.6 | 2 | $n=30$ |
| 186.8 | 183.9 | 2 | $n=31$ |
| 188.8 | 186.9 | 2 | $n=32$ |
| 190.9 | 190.5 | 2 | $n=33$ |
| 193.2 | 194.6 | 2 | $n=34$ |
| 195.6 | 199 | 2 | $n=35$ |
| 198.3 | 203.5 | 2 | $n=36$ |
| 201.3 | 208 | 2 | $n=37$ |
| 204.5 | 212.3 | 2 | $n=38$ |
| 208.1 | 216.4 | 2 | $n=39$ |
| 212.1 | 220 | 2 | $n=40$ |
| 216.4 | 223.1 | 2 | $n=41$ |
| 221.2 | 225.5 | 2 | $n=42$ |
| 226.6 | 227.1 | 2 | $n=43$ |
| 232.5 | 227.5 | 1.9 | $n=44$ |
| 237.6 | 226.9 | 1.8 | $n=45$ |
| 241.7 | 225.8 | 1.6 | $n=46$ |
| 244.8 | 224.8 | 1.5 | $n=47$ |
| 249.1 | 223.2 | 1.3 | $n=48$ |
| 249.1 | 223.2 | 1.3 | $n=49$ |

Fig. 16A

```
<svg xmlns="http://www.w3.org/2000/svg"
 xmlns:xlinm="http://www.w3.org/1999/xlinm"
 width="592" height="864">
<g transform="matrix(1.0,0.0,0.0,1.0,0.0,0.0)">

<path strome="#000000"
 D="
```

| | $V_{3m-1}$ | | $V_{3m}$ | | $V_{3m+1}$ | | |
|---|---|---|---|---|---|---|---|
| | | | | | M 178.1 | 177.3 | m=0 |
| C | 178.1 | 177.3 | 178.8 | 177.4 | 179.2 | 177.4 | m=1 |
| C | 179.6 | 177.4 | 180.1 | 177.5 | 180.5 | 177.6 | m=2 |
| C | 181.8 | 177.9 | 183.0 | 178.6 | 184.1 | 179.5 | m=3 |
| C | 187.2 | 182.0 | 189.4 | 185.7 | 191.3 | 189.2 | m=4 |
| C | 194.7 | 195.2 | 197.9 | 201.5 | 201.9 | 207.2 | m=5 |
| C | 203.8 | 210.0 | 206.0 | 212.5 | 208.3 | 215.1 | m=6 |
| C | 210.7 | 217.8 | 213.8 | 220.5 | 217.1 | 222.3 | m=7 |
| C | 223.4 | 225.9 | 230.6 | 227.6 | 237.8 | 225.9 | m=8 |
| C | 241.6 | 225.1 | 245.1 | 223.9 | 248.8 | 222.6 | m=9 |
| C | 249.3 | 222.4 | 250.0 | 222.9 | 249.7 | 223.5 | m=10 |
| C | 249.6 | 223.6 | 249.4 | 223.7 | 249.2 | 223.8 | m=11 |
| C | 247.5 | 224.5 | 245.8 | 225.2 | 244.1 | 225.9 | m=12 |
| C | 241.7 | 226.9 | 239.0 | 227.7 | 236.4 | 228.1 | m=13 |
| C | 233.6 | 228.5 | 231.0 | 228.5 | 228.1 | 228.3 | m=14 |
| C | 215.8 | 227.1 | 206.2 | 217.2 | 199.7 | 207.5 | m=15 |
| C | 198.0 | 205.0 | 196.8 | 203.0 | 195.3 | 200.5 | m=16 |
| C | 193.9 | 198.1 | 192.5 | 195.3 | 191.2 | 193.1 | m=17 |
| C | 190.5 | 191.7 | 189.6 | 190.3 | 188.8 | 188.9 | m=18 |
| C | 186.8 | 185.2 | 183.8 | 180.1 | 179.2 | 179.4 | m=19 |
| C | 174.9 | 178.7 | 170.6 | 181.0 | 167.0 | 182.9 | m=20 |
| C | 165.1 | 183.9 | 162.7 | 185.5 | 161.0 | 186.7 | m=21 |
| C | 155.3 | 190.9 | 150.1 | 195.5 | 145.2 | 200.6 | m=22 |
| C | 140.1 | 206.0 | 137.9 | 208.3 | 133.4 | 213.2 | m=23 |
| C | 132.6 | 214.0 | 131.9 | 214.8 | 131.1 | 215.6 | m=24 |
| C | 130.7 | 216.0 | 129.6 | 217.2 | 128.8 | 216.7 | m=25 |
| C | 128.2 | 216.2 | 128.7 | 215.2 | 129.3 | 215.0 | m=26 |
| C | 129.3 | 215.0 | 129.7 | 214.7 | 129.8 | 214.5 | m=27 |
| C | 130.7 | 213.6 | 131.6 | 212.7 | 132.4 | 211.7 | m=28 |
| C | 138.1 | 205.5 | 139.0 | 204.5 | 145.3 | 197.9 | m=29 |
| C | 149.1 | 193.9 | 153.4 | 189.9 | 157.9 | 186.7 | m=30 |
| C | 160.8 | 184.6 | 163.6 | 182.4 | 166.8 | 180.9 | m=31 |
| C | 171.1 | 178.7 | 175.6 | 176.6 | 180.6 | 177.6" | m=32 |

```
"></g></svg>
```

Fig. 17A

METHOD AND SYSTEM FOR GENERATING AND SELECTIVELY OUTPUTTING TWO TYPES OF INK VECTOR DATA

BACKGROUND

Technical Field

The present invention is directed to methods and systems for generating and selectively outputting two types of ink vector data usable to reproduce strokes that are hand-drawn on a position input sensor.

Description of the Related Art

Various handwriting input systems are known that allow a user to input hand-drawn (freehand) data by using a pen-shaped device. For example, electromagnetic resonance type pen-tablet input systems are known, which allow input of hand-drawn data including associated pen pressure and pen tilt data. As further examples, electrostatic type pen input systems are known, which create capacitance between a pen-shaped input device and a (tablet) sensor surface similarly to how capacitance is created between a finger and the sensor surface. Still further, input systems that output relatively simple information such as gesture information derived from a collection of determined positions of an input element are known.

Hand-drawn data or stroke (path or trace) data inputted by a pen-shaped implement is stored in a defined data type or format, which can be used (e.g., displayed) on various types of devices and applications, such as ink messaging, ink archiving and retrieval, e-mail, photo annotation, and remote video conferencing applications. Such hand-drawn data is called digital ink or ink data. Ink data is an intermediate data existing between raw data, which consists of coordinate values of user-inputted positions, and raster data, which consists of pixel data which can be directly rendered on a display as an image. As such, most ink data are vector data. Examples of different types of ink data are described in the following non-patent literature DOCUMENTS (D1) through (D5):

(D1) W3C, Recommendation 20, September 2011, "Ink Markup Language (InkML)"
(URL—http://www.w3.org/TR/2011/REC-InkML-20110920/)
(D2) Microsoft Corporation, et al., "Ink Serialized Format Specification" 2007
(URL—http//download.microsoft.com/download/0/B/E/0BE8BDD7-E5E8-422A-ABFD-4342ED7AD886/InkSerializedFormat(ISF)Specification.pdf)
(D3) W3C Working Draft 11, February 2014, "Scalable Vector Graphics (SVG) 2"
(URL—http://www.w3.org/TR/SVG2/); W3C Recommendation, 16 Aug. 2011, "Scalable Vector Graphics (SVG) 1.1 (Second Edition)" (URL—http://www.w3.org/TR/2011/REC-SVG11-201110816/)
(D4) W3C, "HTML5 A vocabulary and associated APIs for HTML and XHTML W3C Recommendation 28 Oct. 2014"
(URL—http://www.w3.org/TR/html5/)
(D5) Slate Corporation, et al., "JOT—A Specification for an Ink Storage and Interchange Format", Version 1.0, September 1996

For example, the InkML (D1) and ISF (D2) data structures represent stroke data inputted by a pen-type device in a manner sharable amongst different applications. SVG (D3) provides a Web standard that permits drawing of a path defined by user-input control points as vector data, regardless of what type of pen device is used as an input device.

The ink data described in (D1) through (D5) all define geometric information needed to reproduce a stroke (or a trace or a path) formed by movement of a pen or a finger. Such geometric information is herein collectively called a "stroke object." A stroke object is vector data information whose data structure includes a set of point or control point coordinates that are used collectively to reproduce a stroke (or a trace or a path) formed by movement of a pen or a finger.

SUMMARY

According to various embodiments, the present invention offers methods and systems for generating and selectively outputting two types of vector data representative of user-input strokes depending on an output request. The embodiments are usable with various types of stroke objects defined in (D1)-(D5) above, and provide technical solutions that were previously not available in (D1)-(D5). For example, the stroke objects defined in (D1)-(D5) or their modifications may be used as one of the two types of stroke objects, which may be converted to generate the other of the two types of stroke objects according to various embodiments of the present invention.

According to one aspect, a computer-implemented method is provided for selectively outputting two types of vector data representative of user-input strokes. Type one stroke objects are generated in a device including a position input sensor, wherein the type one stroke objects represent strokes formed by a user operating a pointer relative to the position input sensor. Each type one stroke object represents a stroke starting at a pen-down time at which the pointer is detectably placed relative to the position input sensor and ending at a pen-up time at which the pointer is removed from the position input sensor. Real-time rendering of a type one stroke object is started after the pen-down time of a stroke represented by said type one stroke object without waiting for completion of the stroke at the pen-up time. After completion of a type one stroke object representative of a stroke from its pen-down time to its pen-up time, the type one stroke object is converted to a type two stroke object, wherein the type two stroke object is a set of segments (e.g., curve segments) defining a boundary of the stroke. The type two stroke object is exported in response to an output request, such as an output request from a bulk drawing application to render a large number of the strokes involving zooming, scrolling, and changing a rendering area of the strokes represented by the type two stroke object.

Unlike the type one stroke object defined with point objects, which are associated with width information and are in the same sequential order as a sequential order in which the stroke represented by the type one stroke object is user-inputted from the pen-down time to the pen-up time, the type two stroke object defines the boundary of the stroke with a set of segments such as a set of Bezier curves. Thus, while not being able to reproduce the same sequential (temporal) order of the user-input, the type two stroke object is suited for rapid rendering involving bulk manipulation (zooming, scrolling, tilting, changing a rendering area of, etc.) of the strokes.

According to one aspect, the type two stroke object is exported as a computer-readable file including a set of Bezier curves as the set of segments defining the boundary of the stroke.

According to a further aspect, each Bezier curve is a cubic curve defined by four control points and the first control point of a Bezier curve coincides with the fourth control point of an immediately preceding Bezier curve.

According to another aspect, the Bezier curves are each explicitly defined by its first, second and third control points and implicitly defined by the third control point of the immediately preceding Bezier curve.

According to another aspect, the computer-readable file is a Scalable Vector Graphics (SVG) file.

BRIEF DESCRIPTION OF THE SEVERAL VIEWS OF THE DRAWINGS

FIG. 16A illustrates a sample computer-readable file including a set of point objects respectively associated with width information to define the stroke represented by the type one stroke object.

FIG. 17A illustrates a sample computer-readable file including a set of Bezier curves defining the boundary of the stroke represented by the type two stroke object.

DETAILED DESCRIPTION

Figure 1A:
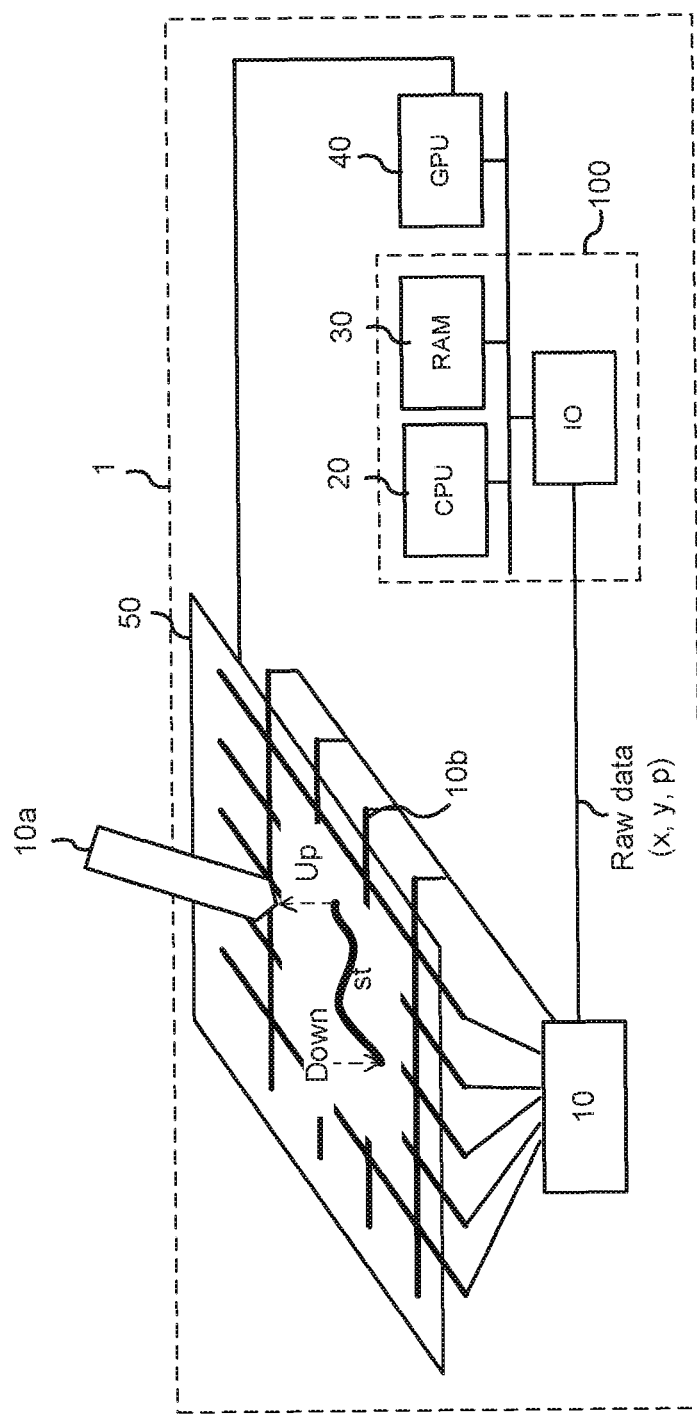
FIGS. 1A and 1B are diagrams illustrating an overall system including a position input sensor, into which hand-drawn data is inputted, and from which raw position data, type one vector data suitable for real-time/fast rendering, or type two vector data suitable for bulk manipulation (zoom, scroll, rotation, changing a rendering area, etc.) is selectively outputted.

As used herein, the following terms have the following general meaning.

"Pen event data" (see FIG. 4) means data inputted based on a user's hand drawing motion. Pen event data may be the raw (position) data as inputted by a given input device 10a, or data that has been processed from the raw data (by a motion event/touch input subsystem 21, for example). While all pen event data are expected to have at least the positional information (e.g., XY coordinates) of a stroke drawn by a user, pen event data is device-dependent and may include additional attributes (e.g., pen pressure data "P", pen rotation or tilt angle data, etc.) that are specific to each type of input device. For example, pen event data received from input devices capable of detecting pen pressure is different from pen event data received from input devices incapable of detecting pen pressure.

"Ink data" means a collection of objects that are derived from pen event data. Ink data captures strokes (paths, traces) based on pen event data and is typically in the form of vector data, which is a type of intermediate data existing between raw data (or pen event data) and raster data (or pixel data) that can be directly rendered on a display as an image. As such ink data describes not only the geometry/shape of the strokes but also their properties, such as colors, transparency values, pressure values, etc. Unlike pen event data, ink data is device-independent and can be shared by different types of devices including, for example, those devices that support pen pressure and/or pen rotation/tilt angle attributes and those devices that do not support these attributes.

One type of ink data disclosed in co-assigned U.S. patent application Ser. No. 14/838,182, filed Nov. 19, 2014, which is incorporated herein by reference (hereinafter "the '182 application"), includes generally four types of objects: stroke objects, metadata objects, drawing style objects, and manipulation objects. Briefly, a "stroke object" defines a shape of a stroke obtained by a user operation of an input device. The "stroke," "path," "trace" and "CanvasPath" described in (D1)-(D5) described above are all stroke objects that can be supported in the ink data of the '182 application. A "metadata object" includes non-drawing related information that describes a stroke object, such as authorship, pen ID, locally obtained date and time information, location information obtained by GPS, etc. A "drawing style object" includes drawing-related information necessary to control or adjust the rendered shape (stroke width, stroke style or stroke pattern) and the rendered color of a stroke object when drawn, expressed, or rasterized on a display. A "manipulation object" is configured to execute a manipulative/modification operation (e.g., a slicing operation, enlargement operation, rotation operation, tilting operation, etc.) on the whole or a part of a pre-existing stroke object. Various embodiments of the present invention disclosed herein are usable and fully compatible with various types of ink data including the ink data disclosed in the '182 application.

Figure 1B:
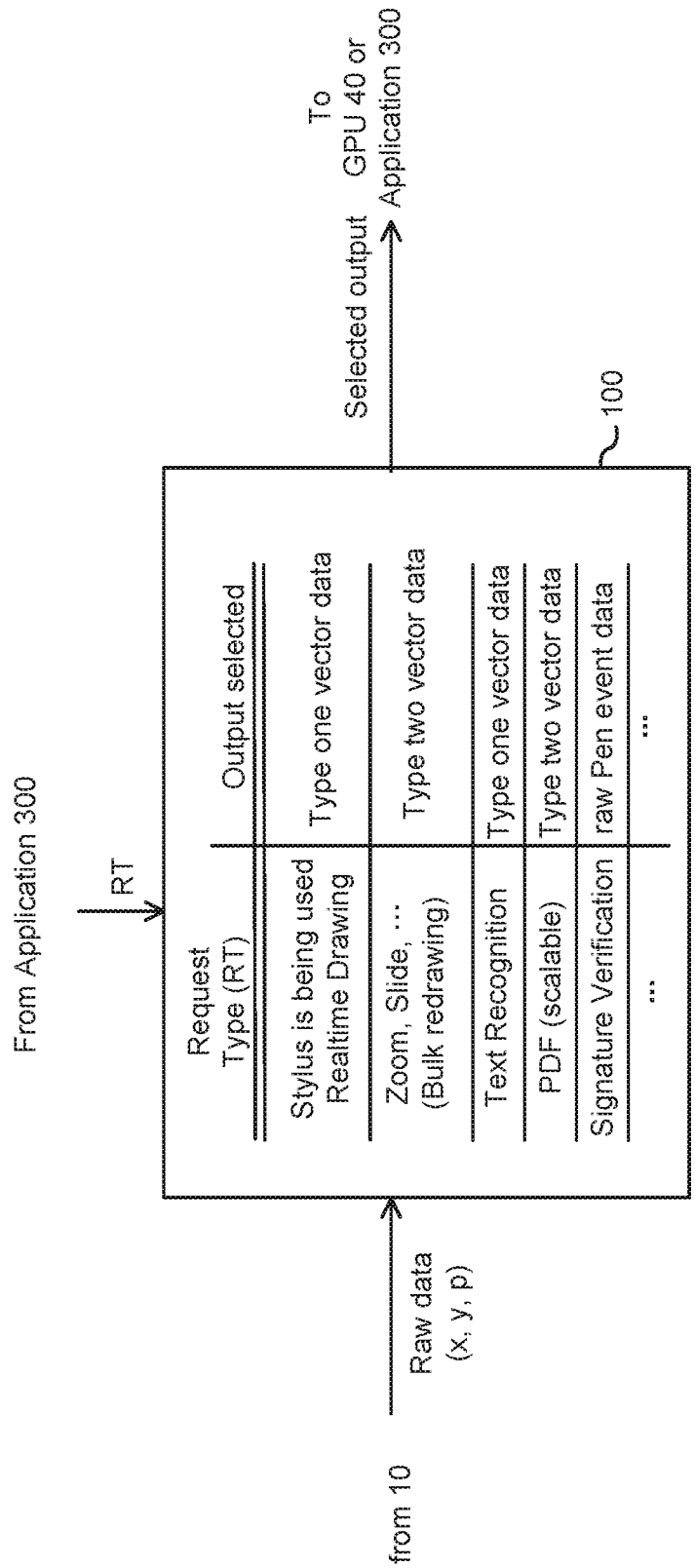

FIGS. 1A and 1B are diagrams illustrating an overall system capable of generating and selectively outputting two types of ink vector data, in addition to the raw (pen event) data, depending on a particular output request or output destination, according to an exemplary embodiment of the present invention. The system includes a position input sensor 50, into which hand-drawn data is inputted based on an operation of an input device 10a such as a stylus, pointer, etc. From a sensor controller 10 of the position input sensor 50, raw position data, type one vector data suitable for real-time rendering for example, or type two vector data suitable for bulk manipulation (zoom, scroll, rotation, changing a rendering area/scope, etc.) and fast-bulk redraw for example is selectively outputted, depending on an output request (RT) from a particular application 300 as illustrated in FIG. 1B. In the illustrated non-limiting example of FIG. 1B, raw position data is outputted in response to an output request from a signature verification application. Type one vector data is outputted for real-time drawing (rendering) of the hand-drawn data as it is inputted by the input device 10a, or in response to an output request from a text (character) recognition application. Type two vector data is outputted in response to an output request associated with bulk drawing manipulation, such as a zooming, rotating, scrolling, or tiling command or a command to change a rendering area (e.g., a command to change which sub-area within an overall area including strokes is to be rendered) to be applied to a set of stroke objects in bulk, or in response to an output request to have the vector data embedded in a PDF file.

The position input sensor 50 may be any one of various types of position input sensors including the electromagnetic type, capacitive type, and resistive type sensors as well known in the art. The position input sensor 50 is typically a part of a computer 1 including necessary hardware/software 100 to process operation of the position input sensor 50, such as a communication module, IO interface control, Sensor IC, CPU 20, memory (RAM) 30. The computer 1 also includes, or has access to, a graphics processing unit (GPU) 40. It should be understood that the computer 1 may include various other components but detailed description thereof is not necessary for the purpose of the present disclosure.

Figure 2:
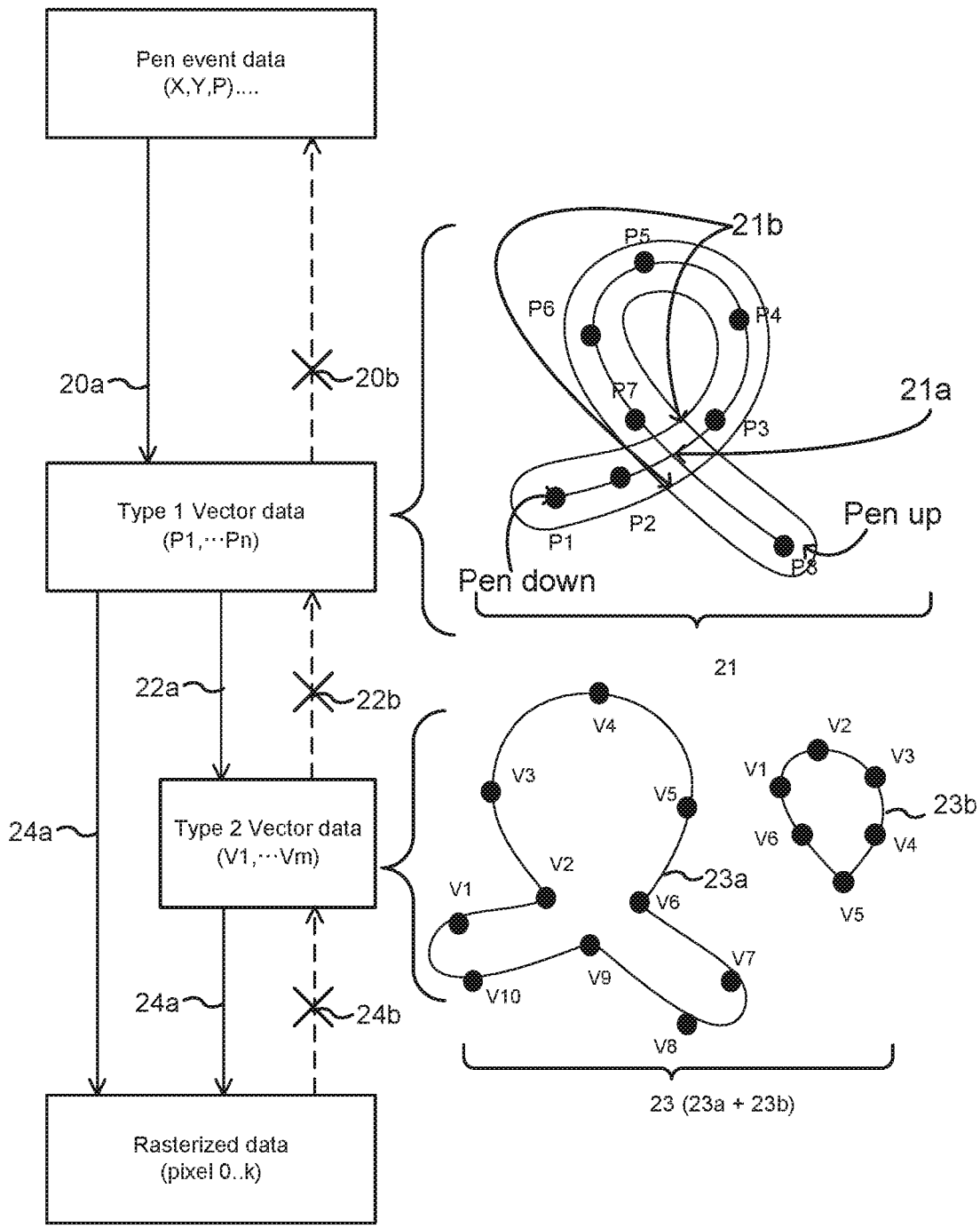
FIG. 2 is a diagram illustrating relationships and conversion (transformation) directions amongst pen event data (or raw position data), type one vector data, type two vector data, and rasterized image data.

FIG. 2 is a diagram illustrating relationships and conversion (transformation) directions amongst the pen event data (or raw position data), type one vector data, type two vector data, and rasterized image data.

In the illustrated example of FIG. 2, the pen event data entered to the position input sensor 50 includes XY coordinates of each entered position and a pressure data "P" associated with the entered position, which is indicative of a pressure value applied by the input device 10a against a surface of the position input sensor 50 at the entered position.

A flow line 20a indicates that the pen event data (X, Y, P) is used to generate type one vector data. The type one vector data includes one or more type one stroke objects 21, each being generated to represent a stroke hand-drawn by the input device 10a on the position input sensor 50. The position input sensor 50 includes a matrix of electrodes 10b. As shown in FIG. 1A, a type one stroke object is configured to represent a stroke ("st") starting at a pen-down time at which the input device 10a is detectably placed relative to the position input sensor 50 ("Down") and ending at a pen-up time at which the input device 10a is removed from the position input sensor 50. As such, type one stroke object 21 is defined by a series of points (or point objects) that are typically in the same sequential order as the sequential order in which the stroke is hand-drawn from its pen-down time to its pen-up time. Also, each of the points has width and/or transparency parameters associated with it, as will be described below. As illustrated in FIG. 2, type one stroke object 21 may include self-intersection 21a, at which the stroke represented by type one stroke object 21 intersects itself.

A flow line 20b indicates that type one vector data is typically not convertible back to the pen event data. Instead, in exemplary embodiments, type one vector data generated from the pen event data is continuously rendered in real time on a display or is stored in a memory device. The stored type one vector data may be used to generate type two vector data or may be selectively outputted to form rasterized data in response to an output request that calls for type one vector data.

A flow line 22a indicates that type one vector data is used to generate, or is converted to, type two vector data suitable for bulk manipulation (zoom, scroll, rotation, changing a rendering area, etc.), for example. Type two vector data includes one or more type two stroke objects 23 that are respectively converted from type one stroke objects 21. A characteristic aspect of type two stroke object 23 is that, unlike type one stroke object 21 which may include self-intersection 21a, type two stroke object 23 consists of one or more simple shapes 23a, 23b that do not include any self-intersection. The type two stroke object 23 is a set of curves defining a boundary of the stroke. In the example of FIG. 2, the type two stroke object 23 consists of the two simple shapes 23a, 23b, wherein the shape 23a comprises a set of curves (e.g., Bezier curves) formed between boundary points V1-V10 defining an interior boundary of the stroke, and the shape 23b comprises a set of curves formed between boundary points V1-V6 defining an interior boundary of the stroke. Type two vector data consisting of simple shapes is suited for bulk drawing and manipulation, such as zooming, rotating, tilting, and changing a rendering area of a (large) set of stroke objects in bulk.

A flow line 22b indicates that type two vector data is typically not convertible back to type one vector data. Instead, in exemplary embodiments, type two vector data generated (converted) from type one vector data is stored in a memory device to be selectively outputted in response to an output request that calls for type two vector data, such as an output request for bulk drawing or an output request to embed stroke objects in a PDF file.

A flow line 24a indicates that either type one vector data or type two vector data may be selectively outputted, depending on a particular output request from a particular application being executed, to form rasterized data consisting of pixel data that can be directly rendered on a screen.

A flow line 24b indicates that rasterized data is typically not convertible back to either type one vector data or type two vector data. Similarly, flow line 20b described above indicates that not only type one vector data but also type two vector data is typically not convertible back to the pen event data.

Figure 3:
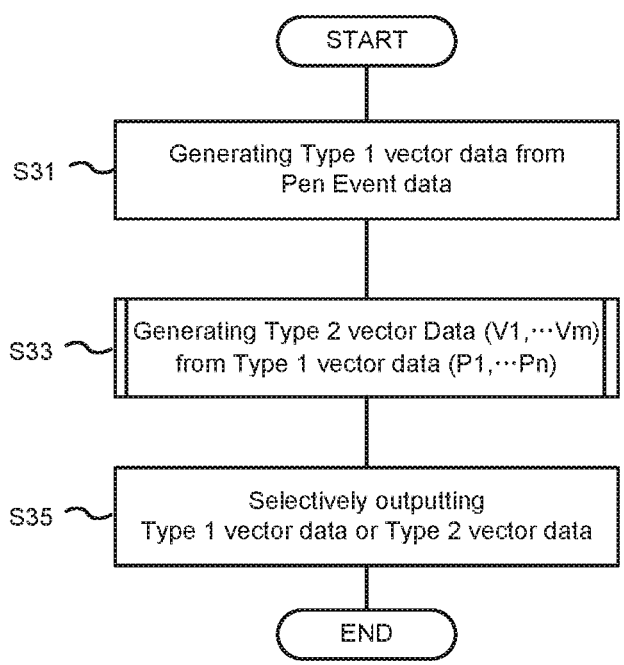
FIG. 3 is a flow chart illustrating a general method of selectively outputting at least type one vector data and type two vector data depending on an output request.

FIG. 3 is a flow chart illustrating a general method of selectively outputting at least type one vector data and type two vector data depending on an output request. As shown in FIG. 1B, in addition to type one and type two vector data, raw (position) data (or pen event data) may be selectively outputted depending on an output request. In step S31, type one vector data is generated based on pen event data inputted to the position input sensor 50 (see flow line 20*a* in FIG. 2). In step S33, type two vector data is generated based on type one vector data (see flow line 22*a* in FIG. 2). In step S35, at least type one vector data or type two vector data is selectively outputted depending on a particular output request.

FIG. 2 illustrates a sample type one stroke object 21 of type one vector data including self-intersection 21*a*. Below, a method and a system for generating and real-time rendering of type one vector data are first described in reference to FIGS. 4-9D, followed by description of a method and a system for generating type two vector data in reference to FIGS. 4 and 10A-14B.

Figure 4:
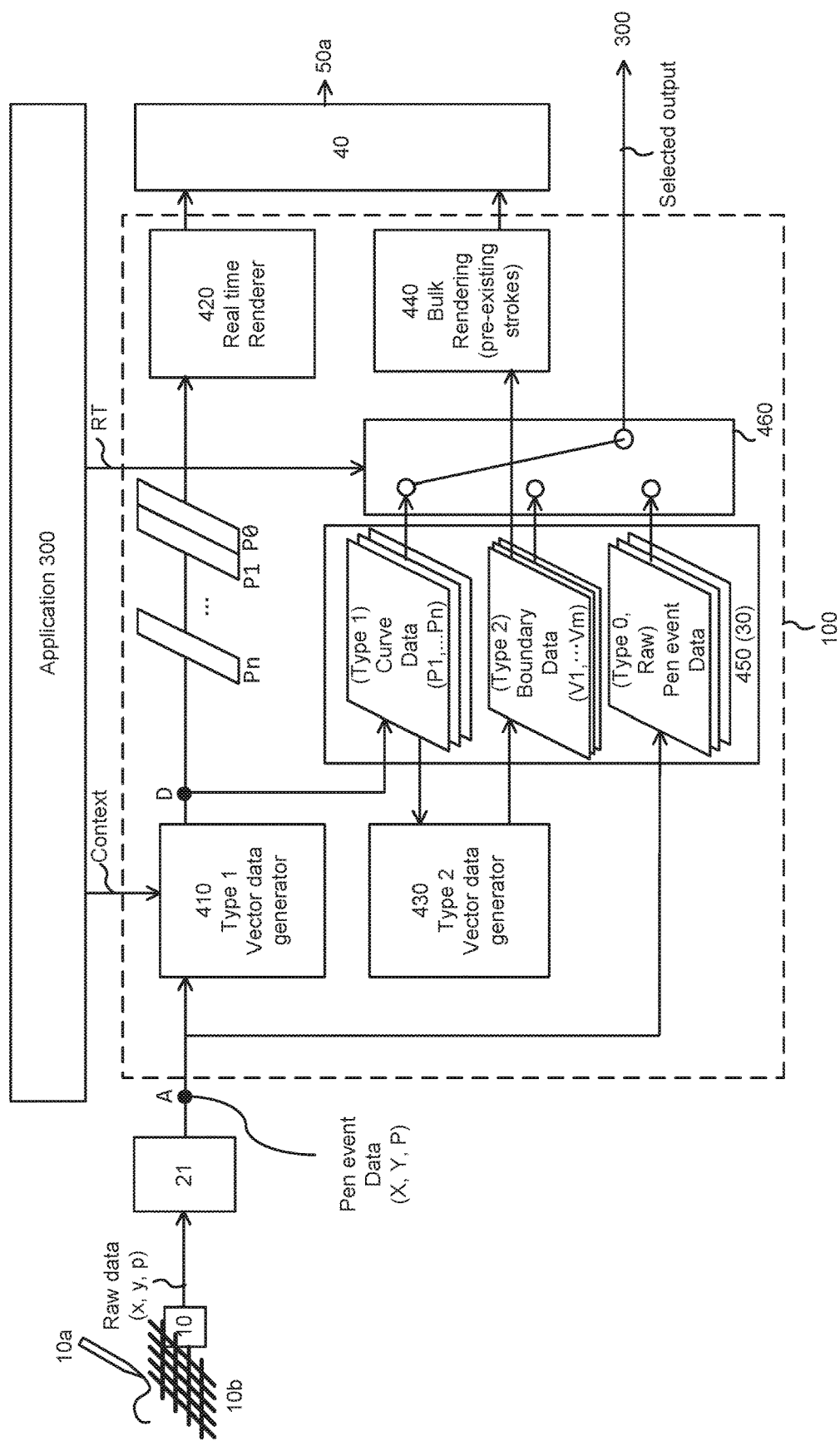
FIG. 4 is a functional block diagram of an ink data processing system including a type one vector data generator, a type two vector data generator (a type one to type two converter), and a selector that selectively outputs the type one vector data or the type two vector data.

FIG. 4 is a functional block diagram of an ink data processing system embodied in the hardware/software 100 of the computer 1, including a type one vector data generator 410, a type two vector data generator (a type one to type two converter) 430, and a selector 460 that selectively outputs type one vector data, type two vector data, or raw pen event data, depending on an output request.

The ink data processing system 100 receives raw data entered by the input device 10*a* and may be processed by the motion event/touch input system 21 into pen event data (x, y, p). As described above, pen event data is device-dependent and may or may not include various attribute values (e.g., pressure and transparency parameters) associated with points entered by the input device 10*a*.

The ink data processing system 100 communicates with an ink data application 300, such as a drawing application and an application that converts a pressure data ("P") that may be included in the inputted pen event data into a width data ("W") indicative of a variable width of a stroke represented by type one stroke object. Details of such application and methods for deriving width values ("W") based on various attribute values are disclosed in the '182 application incorporated by reference above. Briefly, a process may be used to convert pressure data to width data based on a principle that a greater pressure applied by the input device 10*a* against the position input sensor 50 indicates a wider stroke intended by the user and a lesser pressure indicates a thinner (less wide) stroke. Also disclosed in the '182 application is a process of converting speed data included in the inputted pen event data into width data. The process converts speed data, indicative of velocity at which the input device 10*a* is moved at each point, to width data based on a principle that a higher velocity of the input device 10 indicates a thinner (less wide) stroke intended by the user and a lower velocity indicates a wider stroke. Still further disclosed in the '182 application is a process of converting a pressure value into a transparency value ("A") based on a principle that a greater pressure applied by the input device 10*a* against the position input sensor 50 indicates a darker (less transparent) stroke intended by the user and a lesser pressure indicates a more transparent stroke. Also disclosed in the '182 application is a process of converting a velocity value into a transparency value ("A") based on a principle that a higher velocity of the input device 10*a* indicates a more transparent (faint) stroke intended by the user and a lower velocity indicates a darker (less transparent) stroke.

The ink data application 300 may control operation of the ink data processing system 100 to generate type one vector data and type two vector data. The ink data application 300 may also control operation of the selector 460 to selectively output type one vector data, type two vector data, or raw event data. To this end the ink data application 300 may issue to the selector 460 control information indicative of the type of output request (either for type one or type two vector data, for example) and stroke IDs of those strokes that are requested to be outputted.

The ink data processing system 100 is coupled to a graphics processing unit 40, which in turn is coupled to a sensor screen 50*a*. The graphics processing unit 40 receives type one vector data or type two vector data and outputs rasterized data comprising a set of pixel values at a defined resolution level including color (e.g., RGB) values of the pixels, which can then be directly displayed on a screen 50*a*, such as an LCD (which is typically superposed on the position input sensor 50). For example, the graphics processing unit 40 receives point objects that form a type one or type two stroke object, forms curves between the point objects used as control points according to a suitable curve interpolation algorithm such as a Catmull-Rom Curve algorithm and a Bezier Curve algorithm, and draws (renders) the resulting path (stroke) of the stroke object on the display 50*a* using associated GPU libraries such as DirectX® and OpenGL® libraries.

In various examples, the motion event/touch input subsystem 21, ink data application 300, ink data processing system 100, and graphics processing unit 40 coupled to VRAM may all be controlled by an OS running on the computer 1.

The type one vector data generator 410, under control of the ink data application 300, generates type one vector data based on the pen event data received from the position input sensor 50. An exemplary process of generating type one vector data includes generally three steps. First, pen event data detected by the position input sensor 50 is sequentially received. Second, point objects are sequentially generated based on coordinate values included in the received pen event data, wherein a point object is associated with width information ("W"). The point objects serve as control points for interpolating curve segments according to a defined curve interpolation algorithm, such as a Catmull-Rom Curve algorithm. Third, a type one stroke object is generated as a collection of the point objects that define a stroke represented by the type one stroke object. When pen event data includes color and/or transparency information indicative of the color and/or transparency value of each point, such information may also be sequentially obtained to generate point objects that are each associated with a color value and/or a transparency value. When raw pen event data already includes width values, no conversion is needed and the width values can be directly associated with the point objects, respectively. In exemplary embodiments of the present invention, a width value is indicative of a radius of a point object for use in defining a width of a stroke formed by the point object. Thus, by associating a set of point objects forming a stroke with varying width values, a type one stroke object having a variable width along its length can be generated. As used herein, a variable width means both that each point object can be associated with a varying width and that the point objects along the length of the stroke may have widths different from each other.

As shown in FIG. 4, type one vector data generated by the type one vector data generator 410 may then be stored in a memory device 450 as "Curve Data ($P_1, \ldots P_n$), such as P1-P8 forming the type one stroke object 21 in FIG. 2.

Type one vector data includes one or more type one stroke objects, each being formed by a set of point objects, wherein each point object is associated with width information. The stored type one vector data may then be used by the type two vector data generator 430 to generate type two vector data, as will be described later. Alternatively, the stored type one vector data may be selectively outputted by the selector 460 in response to an output request for type one vector data, such as an output request from a text recognition application 300, or any application that requires the stroke to be rendered (reproduced) in the same order as how the stroke was initially inputted in the position input sensor 50. This is possible because, in various exemplary embodiments, type one stroke object 21 (see FIG. 2) is defined by a series of points that are arranged in the same sequential order as the sequential order in which the stroke represented by the stroke object is hand-drawn by the input device.

Additionally or alternatively to storing type one vector data in the memory device 450, the type one vector data generated by the type one vector data generator 410 may be outputted to a real-time renderer 420 to thereby start real-time rendering of each type one stroke object after its pen-down time before, or without waiting for, completion of the stroke object at its pen-up time. In other words, as the user draws a stroke on the position input sensor 50, a type one stroke object representative of the stroke is generated and rendered on the screen 50a in real time so that the user can observe "growth" of a stroke from its initial point to a full length.

Figure 5:
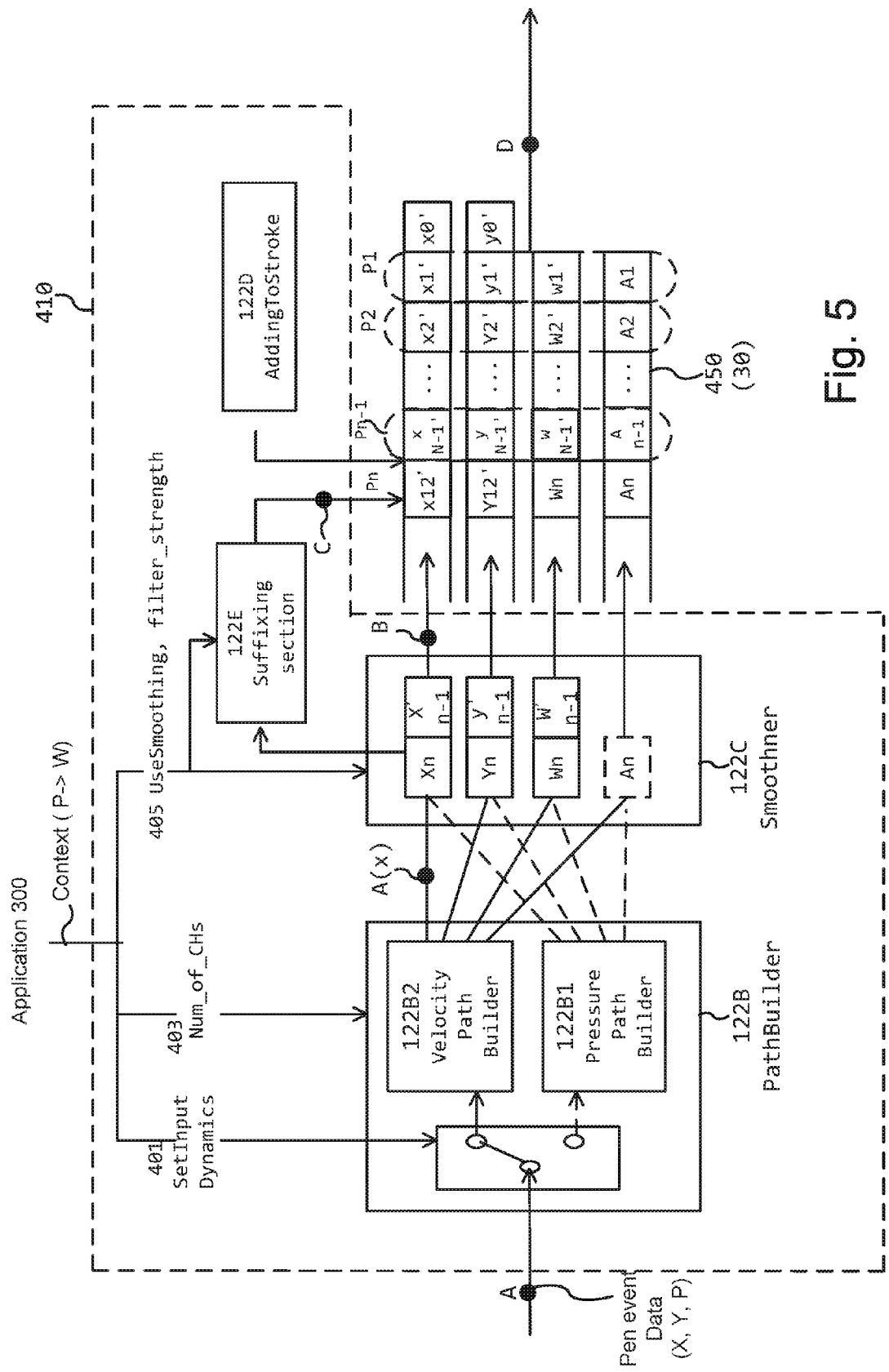
FIG. 5 is a functional block diagram of the type one vector data generator of FIG. 4.

FIG. 5 is a functional block diagram of the type one vector data generator 410 of FIG. 4.

The type one vector data generator 410 receives the pen event data (X, Y, P (pressure)) at "A" and generates type one stroke objects, wherein each point object is associated with width information (W) at "D". In exemplary embodiments, the type one vector data generator 410 continuously generates an increasing number of point objects as the pen event data is inputted. The type one vector data generator 410 continuously outputs the generated point objects to the real-time renderer 420 for real-time image rendering and/or to the memory device 450 for storage.

As shown in FIG. 5, the type one vector data generator 410 includes, or is coupled to, the memory device 450. The type one vector data generator 410 in the illustrated embodiment also includes a path (stroke) builder section 122B, which selects a suitable path builder based on a device type, a smoothener 122C, which starts to apply smoothing processing to a stroke object as it is generated before the stroke object is completed, an adding-to-stroke section 122D, which controls how many point objects should be added to a partially formed stroke object, and a suffixing section 122E, which fills in a gap ("Lag" in FIG. 6) at an end of a type one stroke object.

Point objects continuously generated and stored in memory 450 are used for real time rendering as fragments of a stroke object by the real-time renderer 420 (via "D" in FIG. 5). As such, the memory device 450 may be part of the real-time renderer 420 as opposed to being part of the type one vector data generator 410.

The path (stroke) builder section 122B is configured to select one path builder suited for a particular type of pen event data inputted. For example, if pen event data includes pen pressure values, a Pressure Path builder 122B1 is selected that includes a first (pressure) function f1 capable of deriving stroke width (W) and transparency (A) based on the pen pressure values. On the other hand, if pen event data does not include pen pressure values, a Velocity Path builder 122B2 is selected. The Velocity Path builder 122B2 includes a second (velocity) function f2 capable of deriving stroke width (W) and transparency (A) based on the pen movement speed, which is determined from the amount of change in the point coordinates or time stamps included in most pen event data. In other words, the Velocity Path builder 122B2 substitutes velocity values for pressure values used in the Pressure Path builder 122B1. The output from the path builder section 122B, which defines each point object with its XY coordinates and width (W) and, optionally, transparency (A) values, is indicated by "A(x)" in FIG. 5.

The smoothener 122C receives the point objects outputted from the path builder section 122B and applies a smoothing processing thereto. In various exemplary embodiments, the smoothener 122C starts to apply smoothing processing to a stroke object including point objects as the stroke object is being generated before it is completed. Any suitable smoothing processing or algorithm may be used, such as acceleration averaging, weight averaging, exponential smoothing, double-exponential smoothing, etc.

Figure 6:
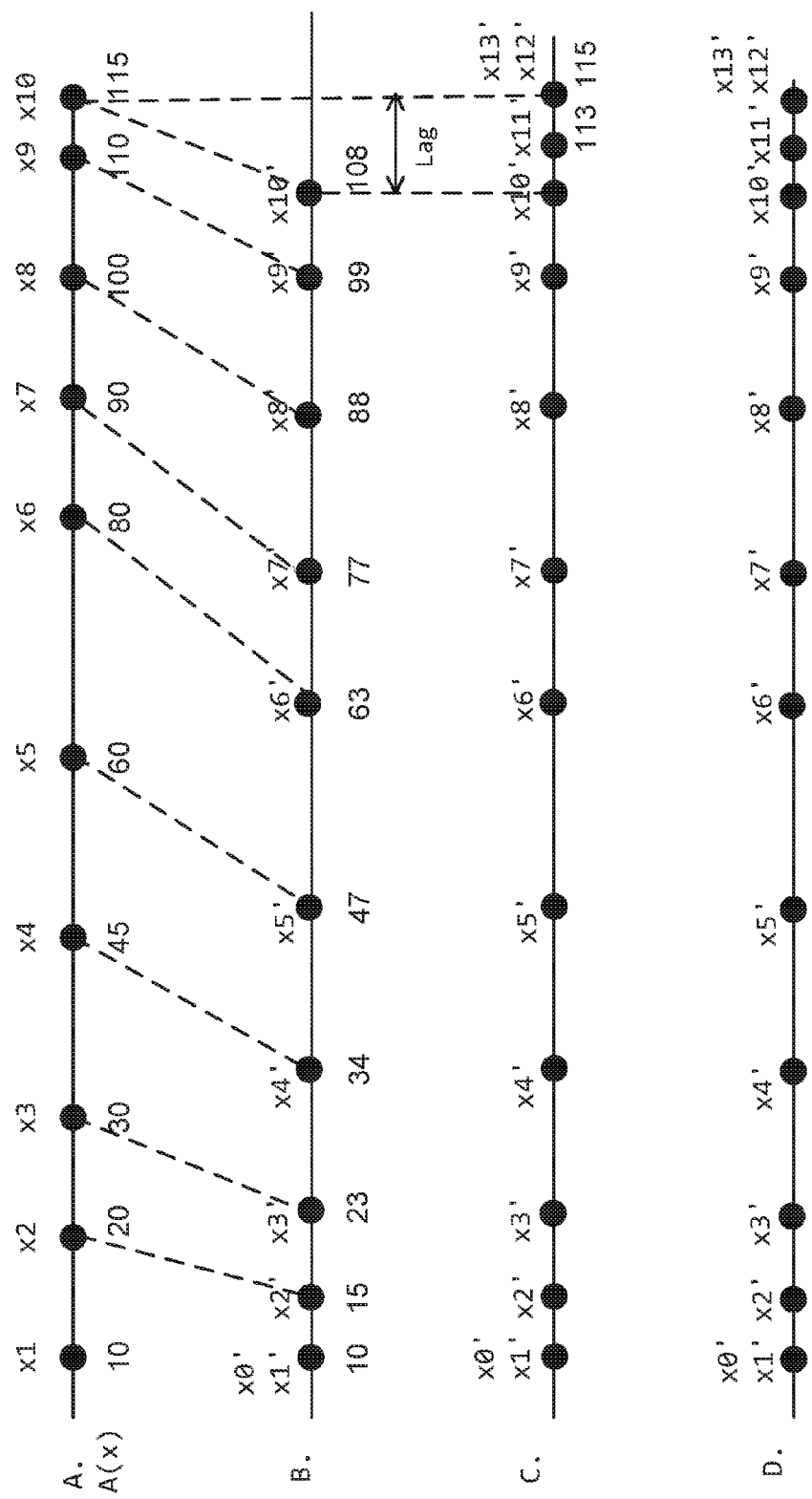
FIG. 6 illustrates the processing performed at points "A" through "D" in the type one vector data generator of FIG. 5.

FIG. 6 illustrates the processing performed at points "A/A(x)" through "D" in the type one vector data generator 410 of FIG. 5. FIG. 6 illustrates smoothing processing applied by the smoothener 122C between row A and row B. Row A corresponds to point "A/A(x)" in FIG. 5 (before smoothing) and row B corresponds to point "B" in FIG. 5 (after smoothing). In row A, x1~x10 represent coordinates of 10 points obtained from the pen event data. In FIG. 6, x1~x10 are (10, 20, 30, 45, 60, 80, 90, 100, 110, 115).

In row B, x1'~x10' represent X coordinates of the 10 points after a smoothing processing has been applied. In the illustrated example, the following exponential smoothing function is applied.

$$X1'=\alpha*X(t-1)+(1-\alpha)*X(t-1)' \quad \text{(Eq. 1)}$$

where the filter strength $\alpha=0.5$.

In FIG. 6, x1'~x10' are (10, 15, 23, 34, 47, 63, 77, 88, 99, 108).

The smoothing processing by the smoothener 122C is applied on a rolling basis to each of the points as their point coordinates are derived, to continuously output modified (smoothed) positions of these points. Thus, from the pen-down time at which a pen down event is detected, the type one vector data generator 410 may start to generate and output a partially formed, smoothed stroke object, before (without waiting for) the pen-up time at which a pen up event is detected.

In row B, point x0' is added in the illustrated example where the Catmull-Rom Curve is used to define an interpolation curve between each pair of control points. As well known in the art, the Catmull-Rom Curve defines each curve segment with four control points including a start point (Pi), an end point (Pi+1), a point "before" the start point (Pi−1), and a point "after" the end point (Pi+2). Thus, to define a starting curve segment between points x1' and x2', the start point x1' is duplicated to create a new point x0' (at the same position as x1') that may be used with points x1', x2' and x3' as control points for defining the curve segment between x1' and x2'. The position of the new point x0' may be adjusted (curve-fitted) to a position where the Catmull-Rom Curve between x1' and x2' best fits the inputted stroke. By simply duplicating a value of x1' (p1) to create a value of x0' (p0), the process can instantly define a position of x0' and set components of a vector from x0' (p0) to x1' (p1) as zero. The process is suited for real-time implementation (no need to wait for p2 to generate p0), and does not unduly influence the curvature of the curve segment between x1' (p1) and x2' (p2), such as undesirably pushing the curvature to one side or another.

Still referring to FIGS. 5 and 6, the suffixing section 122E fills in a gap (or "Lag") between the inputted position at the end of a stroke object (x10, row A) and the smoothed position at the end of the stroke object (x10', row B). In FIG.

6, row C illustrates the "Lag" filling (suffixing) operation. In the illustrated example, after the smoothing processing, a "Lag" is created between the originally inputted position x10 (115) and the smoothed position x10' (108) at the end of the stroke object in row B. In exemplary embodiments, the type one vector data generator 410 is configured to determine whether to perform or not perform the suffixing operation depending on, for example, control information received from the ink data application 300. In other embodiments, the suffixing operation can be invoked every time a new point object is added to the stroke object, which may be suitable for the purpose of real-time rendering, for example.

If the suffixing operation is to be performed, in row C of FIG. 6, the suffixing section 122E adds new point objects at x11', x12' and x13'. Point x12' is added at the same position as the originally inputted last position x10 (115) of row A. Point x11' is added at a smoothed point between points x10' and x12'. Finally, because in this example the Catmull-Rom Curve is used to define an interpolation curve between each pair of control points, the end point x12' is duplicated to create a new point x13' (at the same position as x12'), which is needed to define an ending curve segment between x11' and x12' as the Catmull-Rom Curve. The position of the new point x13' may be adjusted (curve-fitted) to a position where the Catmull-Rom Curve between x11' and x12' best fits the inputted stroke. Also, even when the suffixing operation is not performed, if the Catmull-Rom Curve is used, the last smoothed point x10' in row B may be duplicated to create a new point x10' (new), which may be used with points x8', x9' and x10' as control points to define the last curve segment between x9' and x10' in this case. By simply duplicating a value of x10' to create a value of x10' (new), the process can instantly define a position of x10' at a neutral position, without unduly influencing the curvature of the curve segment between x9' (p9) and x10' (p10).

Referring back to FIG. 5, the adding-to-stroke section 122D determines (or keeps track of) how many of the point objects, which have been smoothed and perhaps suffixed, are stored in the memory device 450 and thus can be added to a partial data of the type one stroke object to be outputted. In the illustrated embodiment, point objects P1~Pn−1 are stored in the memory device 450 and determined to be added to the partial data of the type one stroke object to be outputted to the real-time renderer 420 or to the memory device 450 (without waiting for completion of the entire type one stroke object). The real-time renderer 420 is capable of displaying the partially formed type one stroke object (as will be illustrated in FIG. 8). The memory device 450 will continuously store the partially formed type one stroke object until the entire type one stroke object is stored.

In FIG. 6, row D illustrates the type one stroke object, which has been smoothed (from row A to row B), and perhaps suffixed at the end (from row B to row C), and continuously outputted by the adding-to-stroke section 122D. The type one stroke object in the illustrated embodiment is defined to generate interpolation curves according to a Catmull-Rom Curve algorithm, wherein each curve segment (Pi-Pi+1) is defined by four control points (Pi−1, Pi, Pi+1, Pi+2) and the resulting curve passes through all of the control points, which is a characteristic of the Catmull-Rom Curve. Thus, the type one stroke object includes a starting curve segment (x1'-x2') defined by four control points x0', x1', x2', x3, and includes an ending curve segment (x11'-x12') defined by four control points x10', x11', x12', x13'.

Figure 7:
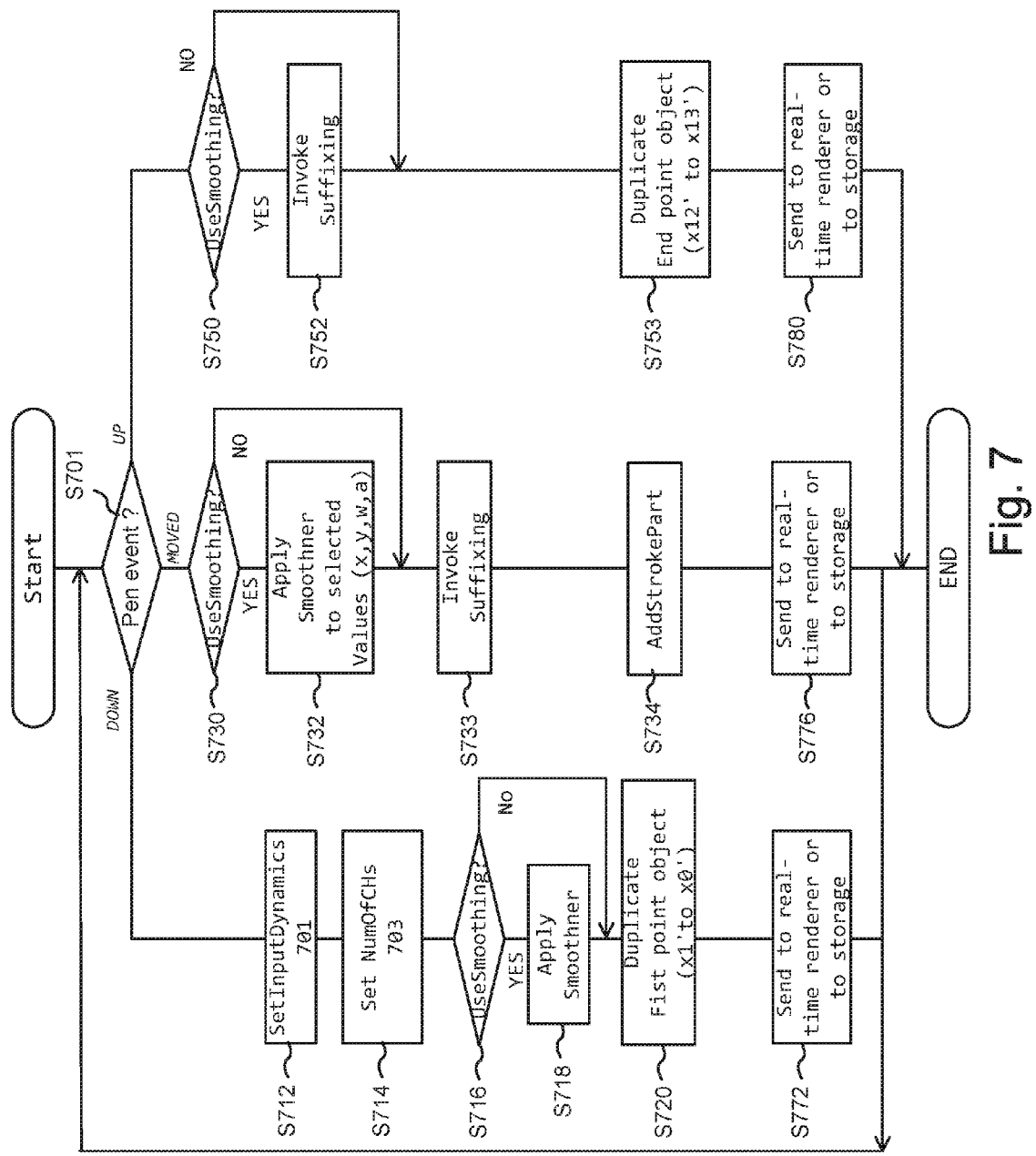
FIG. 7 is a flow chart illustrating a sample routine performed by the type one vector data generator of FIG. 5.

FIG. 7 is a flow chart illustrating a sample process performed by the type one vector data generator 410. In step S701, the type one vector data generator 410 receives pen event data, which includes position coordinates (x, y) and timing information indicative of one of the following three types of timing:

1) Pen down time, when a pointer such as a finger or a pointing device (e.g., pen-type device) comes into contact with another (sensing) object;

2) Pen moving time, between a pen down time and a pen up time;

3) Pen up time, when a pointer is moved away (removed) from another (sensing) object.

1. A Processing Flow at Pen Down Time

In step S712, the type one vector data generator 410, based on control information (Set Input Dynamics 401 in FIG. 5) received from the ink data application 300 (see FIG. 4) for example, selects one path builder (e.g., 122B1 or 122B2 in FIG. 5) out of a plurality of path builders to use to build a type one stroke object.

In step S714, the type one vector data generator 410, based on control information (Num_of_CHs 403) received from the application 300 for example, determines a set of parameters to be outputted from the path builder selected in step S712 above. A set of parameters to be outputted may be, for example, (x, y, W, A) and (x, y, W), where (x, y) are x, y coordinates of the point objects, W is a stroke width value, and A is alpha (a) indicative of transparency (or opacity). In addition to the 2D coordinates (x, y), a "z" value may be added to produce 3D coordinates for each point.

In step S716, the type one vector data generator 410, based on control information received from the application 300 for example (Use Smoothing, filter-strength 405), determines whether smoothing processing is to be applied to the set of parameters outputted from the selected path builder. The control information may also indicate to which ones of the parameters the smoothing processing is applied.

When application of the smoothing is indicated (YES to step S716), in step S718, the indicated smoothing processing is applied. Control information from the application 300 may additionally include sampling rate information of the position input sensor 50, which the type one vector data generator 410 may use to select a smoothing process of desired strength level. For example, when the sampling rate of the position input sensor 50 is lower (e.g., 10's of samples per second as opposed to 100's of samples per second, out of typically 60-240 samples per second), a stronger smoothing process having a greater smoothness value (effect) may be selected.

In step S720, as illustrated above in reference to FIG. 6, row B, the initial point (control point) x1' is duplicated to generate a new control point x0' for defining a starting curve segment between x1' and x2' as a Catmull-Rom Curve.

In step S772, the type one vector data generator 410 sends the smoothed initial (starting) curve segment of the type one stroke object to the real-time renderer 420 or to the memory device 450 depending on user command or control information from the application 300. A suitable curve interpolation algorithm such as the Catmull-Rom Curve algorithm is applied to build an interpolated curve using the smoothed point objects as control points.

2. A Processing Flow at Pen Moving Time

Returning back to the initial step S701 of the flow chart, when the type one vector data generator 410 detects pen moving time, i.e., the pen is moving between a start point and an end point, the type one vector data generator 410 receives the x, y coordinate values as well as time stamp and/or pen pressure information of a point as included in the pen event data, and uses the path builder selected in step S712 above to prepare and output a set of parameters (e.g., x, y, W, A) for the point as determined in step S714 above.

In step S730, the type one vector data generator 410, based on control information received from the application 300 for example, determines whether smoothing processing is to be applied to the received set of parameters (x, y, W, A) for the point. The control information may additionally indicate to which ones of the parameters the smoothing processing is applied. Operation of step S730 is the same as that of step S716 described above.

When application of the smoothing is indicated (YES to step S730), in step S732, the indicated smoothing process is performed. Also, depending on control information received from the application 300 for example, in step S733 the type one vector data generator 410 additionally performs the suffixing operation as shown in FIG. 6, row C. The suffixing operation is not mandatory and not necessarily performed in each operation. For example, when smoothing processing is not performed, suffixing operation is not needed and not performed.

In step S734, the type one vector data generator 410 uses the adding-to-stroke section 122D to determine how many of the point objects are established and stored in the memory device 450 to be added to a partial data of the type one stroke object to be outputted.

In step S776, the type one vector data generator 410 sends the smoothed middle curve segment of the type one stroke object to the real-time renderer 420 or to the memory device 450 in response to user command or control information from the application 300. A suitable curve interpolation algorithm such as the Catmull-Rom Curve algorithm is applied to build an interpolated curve using the smoothed point objects as control points. The middle curve segments are continuously outputted so that, for example, the real-time renderer 420 may display the middle portion of the type one stroke object in continuation to the initial portion of the type one stroke object outputted in step S772 above.

3. A Processing Flow at Pen Up Time

Returning back to the initial step S701 of the flow chart, when the type one vector data generator 410 determines the event type to be a pen up event (i.e., drawing of a type one stroke object is completed and the input device 10 is removed from the position input sensor 50), the type one vector data generator 410 receives the x, y coordinate values as well as time stamp and/or pen pressure information of a point as included in the pen event data, and uses the path builder selected in step S712 above to prepare and output a set of parameters (e.g., x, y, W, A) for the point as determined in step S714 above.

In step S750, the type one vector data generator 410 determines whether smoothing processing is to be applied to the received set of parameters, (x, y, W, A) for the point, as well as to which ones of the parameters the smoothing processing is applied. Operation of step S750 is the same as that of steps S716 and S730 described above.

When application of the smoothing is indicated (YES to step S750), in step S752, the indicated smoothing process is performed. Also, depending on control information received from the application 300 for example, the type one vector data generator 410 additionally performs the suffixing operation as shown in FIG. 6, row C. The suffixing operation is not mandatory and not necessarily performed in each operation. For example, when smoothing processing is not performed, suffixing operation is not needed and not performed.

In step S753, also as illustrated in FIG. 6, row C, the end point (control point) x12' is duplicated to generate a new control point x13' for defining an ending curve segment between x11' and x12' as a Catmull-Rom Curve.

In step S780, the type one vector data generator 410 sends the smoothed (and suffixed) ending curve segment of the type one stroke object to the real-time renderer 420 or to the memory device. A suitable curve interpolation algorithm such as the Catmull-Rom Curve algorithm is applied to build an interpolated curve using the smoothed and suffixed point objects as control points. The ending curve segment is outputted in continuation to the middle portion of the type one stroke object outputted above to thereby complete the type one stroke object as a whole.

The type one vector data generator 410 and the associated process as illustrated in FIG. 7 are thus capable of continuously inputting pen event data and outputting a partially formed type one stroke object as it is built. The outputted partial type one stroke object may be continuously stored in the memory device 450 or continuously sent to the real-time renderer 420 for real-time display (rendering) of the hand-drawn stroke represented by the type one stroke object.

Figure 8:
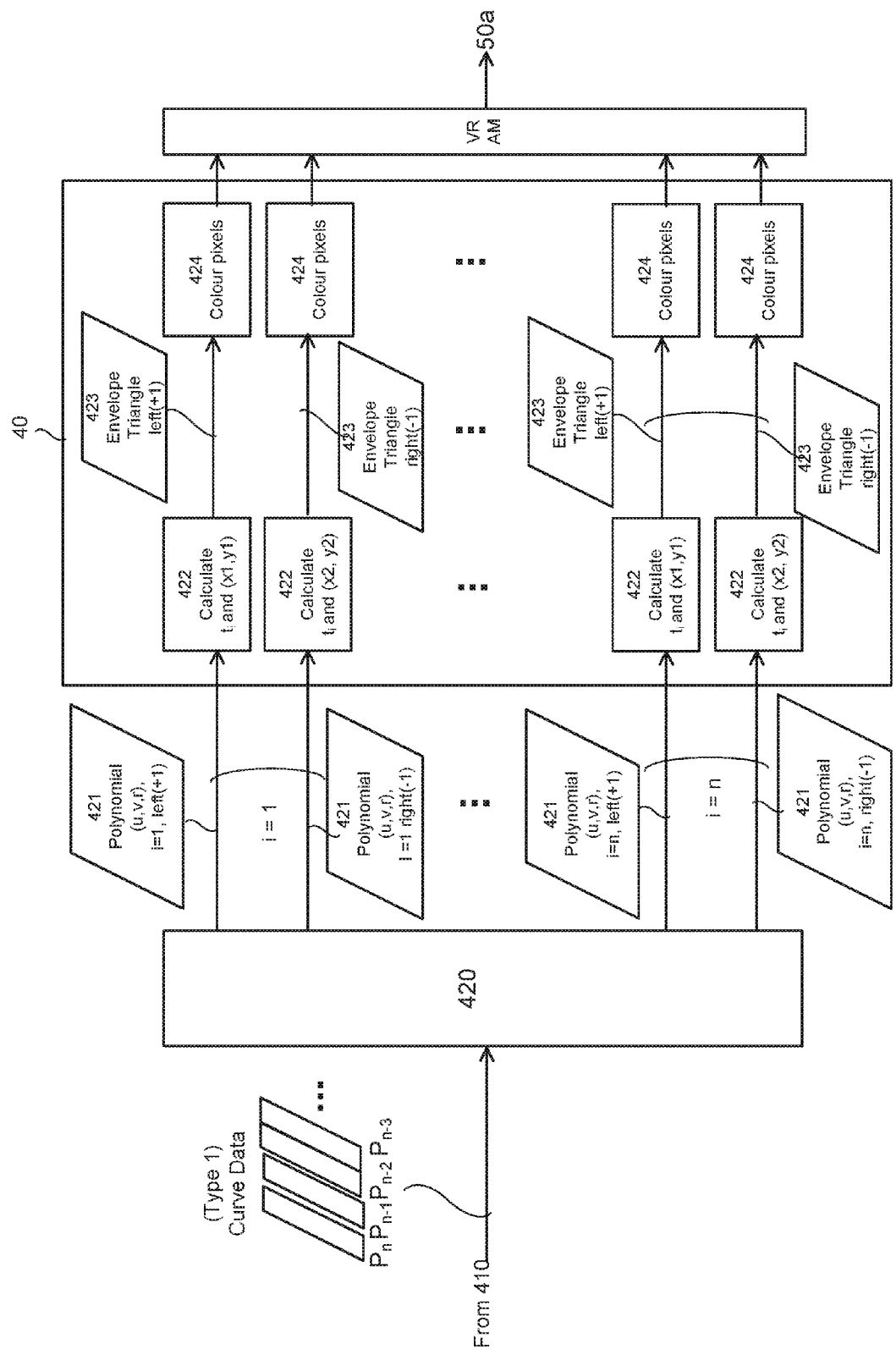
FIG. 8 is a functional block diagram of a real-time renderer and a graphic processing section, which together perform real-time rendering of type one vector data.

FIG. 8 is a functional block diagram of the real-time renderer 420 and the graphics processing unit 40, which together perform real-time rendering of type one vector data. The demarcation between the real-time renderer 420 and the graphics processing unit 40 is not limited to what is illustrated in FIG. 8, and some of the functions may be combined, further divided, or differently shared between the real-time renderer 420 and the graphics processing unit 40 depending on, for example, the rendering setting of each program application. In the exemplary embodiments as illustrated, however, those functions and calculations that can be hardware-accelerated are advantageously carried out in the graphics processing unit 40 to support real-time rendering of type one vector data.

Figure 9A:
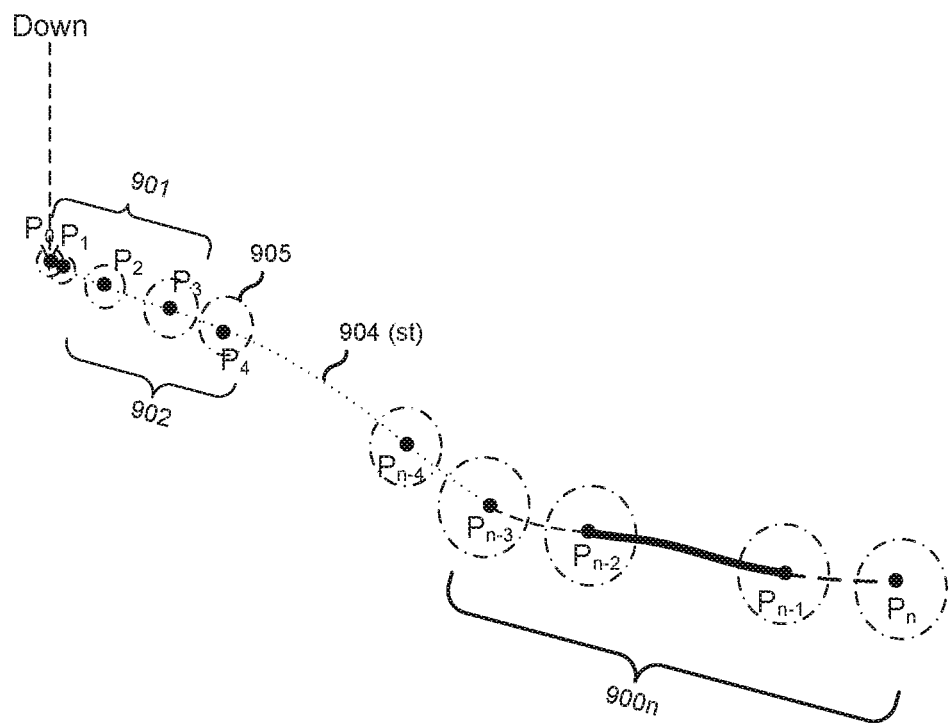
FIGS. 9A-9D illustrate processes of generating and rendering a type one stroke object.
Figure 9B:
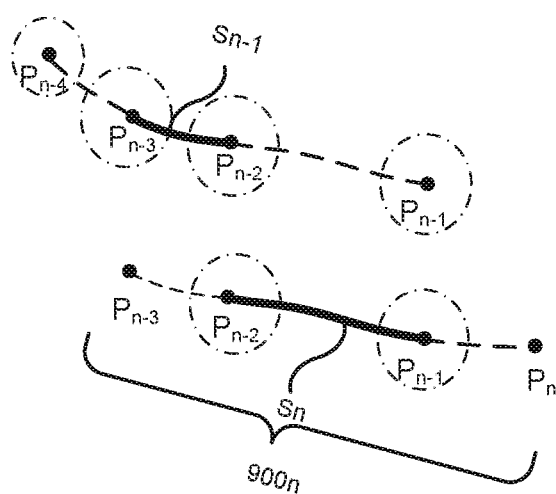

Type one vector data generated by the type one vector data generator 410 is inputted to the real-time renderer 420. In the illustrated example, type one vector data includes type one stroke objects each consisting of a set of point objects Pn each associated with width information "W." When Catmull-Rom curves are used to define a type one stroke object, each curve segment of the type one stroke object is defined by four control points, as discussed above, in a sliding manner with each subsequent curve segment defined by four subsequent control points. As shown in FIG. 9A, the first curve segment is defined by four control points P0-P3 (901), the second curve segment is defined by four control points P1-P4 (902), and the (n−2)th curve segment is defined by four control points Pn−3-Pn (900n). FIG. 9B illustrates input data from the type one vector data generator 410 ((Type 1) Curve Data) to the real-time renderer 420, as shown in FIG. 8, at any given time. FIG. 9B shows that, after receiving the four control points defining the curve segment Sn−1, the real-time renderer 420 receives the subsequent four control points 900n defining the curve segment Sn.

Figure 9C:
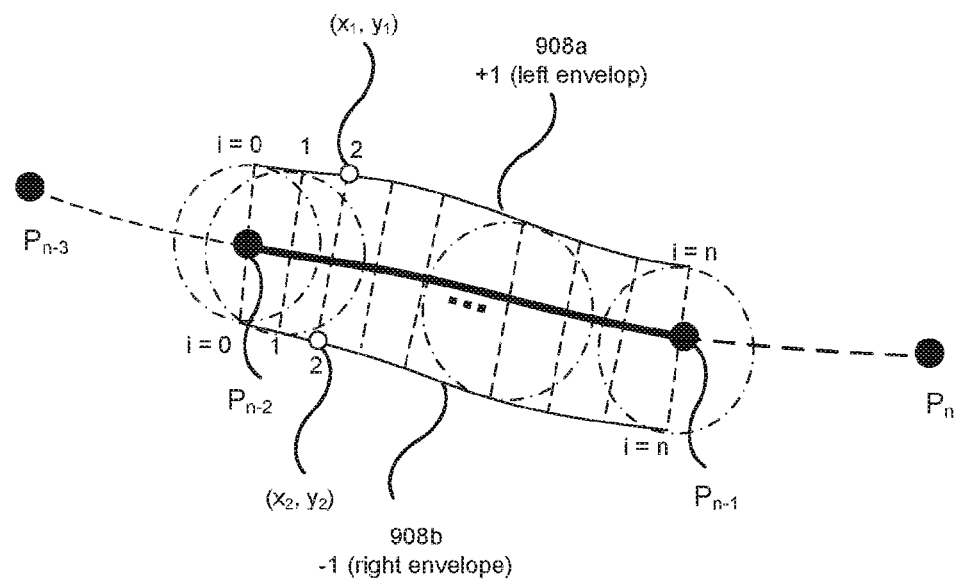

The real-time renderer 420 segments each of the curve segments, as inputted, into a set of division points i (=0-n) as shown in FIG. 9C. The number and positions of division points i may be calculated, per each curve segment, taking into consideration, for example, pixel resolution of the display 50a, contour/shape of the type one stroke object, etc. For example, the display pixel resolution may be considered to determine the optimal number and positions of the first segmentation points to be placed along each curve segment of the type one stroke object to achieve realistic rendition of the stroke on the display 50a.

Specifically, each of the curve segments (e.g., Catmull-Rom curve segments) forming a type one stroke object is segmented by division point i between two (out of four) control points that define the curve segment. The resulting division points for each curve segment thus include the original control points (e.g., four control points for a Catmull-Rom curve segment) that define the curve segment and additional division points inserted between two adjacent control points. In other words, the division points reuse the original control points defined for the curve segment as inputted from the type one vector data generator 410, and additionally include "filler points" added to achieve a desired level of pixel resolution when the type one stroke object is rendered. After the division points i are determined for one or more curve segments forming a type one stroke object, a suitable smoothing algorithm, described above in reference to FIG. 7, may be applied to smooth out the division points. The resulting division points, including the original control points and the added filler points, are then used as vertices to be connected with straight lines to form triangles to be filled (see FIG. 9D).

As shown in FIG. 9A, application of the Catmull-Rom Curve algorithm to control points P0 . . . Pn will produce a curve 904. The curve 904 is formed to pass through all of the control points (P0 . . . Pn), which is a characteristic of the Catmull-Rom Curve.

When each division point is associated with a width value as in the illustrated embodiment of FIG. 9C, the width value is used to define a radius of a circle 905 (see FIG. 9A) centered around each division point (i.e., a control point for defining a curve segment) to thereby add a variable width to the stroke represented by the type one stroke object, as illustrated. As a width value for a division point, the width value(s) of the two original control point(s) may be used or a new width value calculated based on the original width value(s) may be used. For example, when filler points are added as the division points, width values for the filler points may be calculated based on a suitable interpolation method using known width values associated with the original control points (point objects) as inputted from the type one vector data generator 410. Similarly, other attribute values such as color and transparency values for the division points may be derived from the color and transparency values of the original control points.

The curve 904 with a variable width has a different width (or radius) at each of its control points (division points). One way to calculate the boundary of the curve 904 is to calculate an envelope 908 (908a/908b in FIG. 9C) of a set of circles centered on the control points (division points) along the length of the curve 904, wherein the radius (or diameter) of each circle corresponds to the width value associated with each division point i. Then the points that belong to the envelope 908 will satisfy the following conditions.

$$\begin{cases} F(x, y, t) = (x - u(t))^2 + (y - v(t))^2 - r(t)^2 & \text{(Eq. 2)} \\ \dfrac{dF(x, y, t)}{dt} = 0 \end{cases}$$

Further, when the Catmull-Rom Curve algorithm is used to interpolate the type one stroke object, the following polynomial functions u(t), v(t) and r(t) can be defined, wherein $P_{i-3}$-$P_i$ define four control points needed to define each curve segment: a start point ($P_{i-2}$), an end point ($P_{i-1}$), a point "before" the start point ($P_{i-3}$), and a point "after" the end point ($p_i$).

$$\begin{cases} u(t) = \dfrac{1}{2} \begin{bmatrix} 1 & t & t^2 & t^3 \end{bmatrix} \begin{bmatrix} 0 & 2 & 0 & 0 \\ -1 & 0 & 1 & 0 \\ 2 & -5 & 4 & -1 \\ -1 & 3 & -3 & 1 \end{bmatrix} \begin{bmatrix} P_0\,[x] \\ P_1\,[x] \\ P_2\,[x] \\ P_3\,[x] \end{bmatrix} \\ v(t) = \dfrac{1}{2} \begin{bmatrix} 1 & t & t^2 & t^3 \end{bmatrix} \begin{bmatrix} 0 & 2 & 0 & 0 \\ -1 & 0 & 1 & 0 \\ 2 & -5 & 4 & -1 \\ -1 & 3 & -3 & 1 \end{bmatrix} \begin{bmatrix} P_0\,[y] \\ P_1\,[y] \\ P_2\,[y] \\ P_3\,[x] \end{bmatrix} \\ r(t) = \dfrac{1}{2} \begin{bmatrix} 1 & t & t^2 & t^3 \end{bmatrix} \begin{bmatrix} 0 & 2 & 0 & 0 \\ -1 & 0 & 1 & 0 \\ 2 & -5 & 4 & -1 \\ -1 & 3 & -3 & 1 \end{bmatrix} \begin{bmatrix} P_0\,[w]/2 \\ P_1\,[w]/2 \\ P_2\,[w]/2 \\ P_3\,[w]/2 \end{bmatrix} \end{cases} \quad \text{(Eq. 3)}$$

For each of the division points i, as shown in boxes 421 in FIG. 8, the real-time renderer 420 passes the definitions of the polynomials (Eq. 2) and (Eq. 3), and "left" (+1) and "right" (−1) indexes to the graphics processing unit 40. Specifically, as shown in FIG. 9C, each division point i (t=i, where i=0, . . . n) is associated with its "left" coordinates (x1, y1) and its "right" coordinates (x2, y2), such that each curve segment defined by the set of division points i have two outline curves (or envelopes), one defined by a set of "left" coordinates and the other defined by a set of "right" coordinates.

Operation boxes 422 in the graphics processing unit 40 solve (Eq. 2) and (Eq. 3) above to produce two "left" and "right" points (x1, y1) and (x2, y2) for each of the division points $t_i$. Resulting sets of points $(x_1, y_1)$ and $(x_2, y_2)$ form the outline curves 908a and 908b that together envelop the stroke represented by the type one stroke object, as shown in FIG. 9C.

Figure 9D:
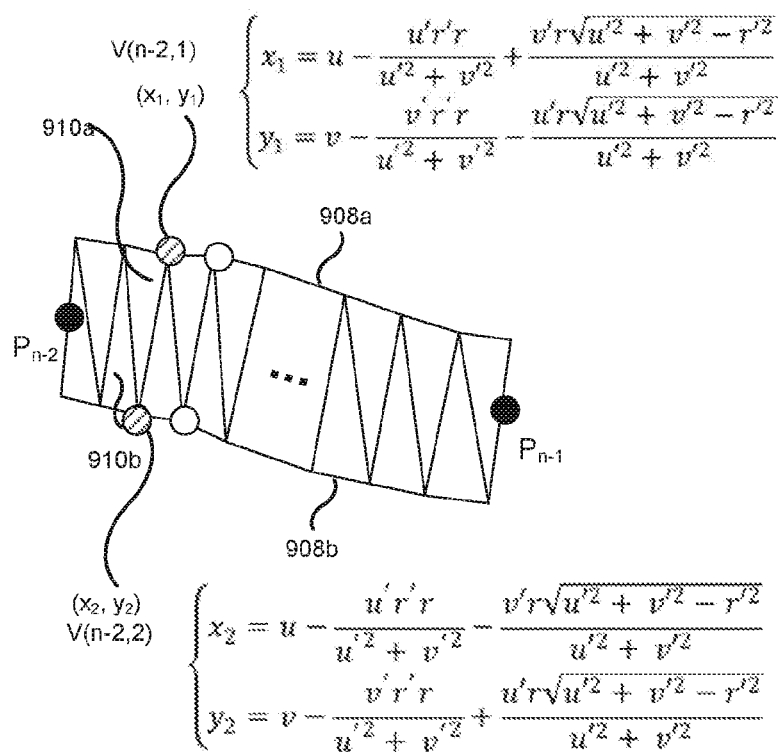

Boxes 423 in the graphics processing unit 40 indicate envelope triangles 910a, 910b, etc., as shown in FIG. 9D, which are prepared by the operation boxes 422. Connecting the two sets of points $(x_1, y_1)$ and $(x_2, y_2)$ along the two outline curves 908a and 908b segments the stroke into multiple triangles 910a, 910b, etc., whose vertices are defined by the two sets of points $(x_1, y_1)$ and $(x_2, y_2)$.

Operation boxes 424 in the graphics processing unit 40 then apply color values, which are typically associated with the control points (division points), respectively, to color the triangles 910 (910a, 910b, etc.) and hence pixels on the display 50a. Any suitable coloring algorithm to color the triangles 910 may be applied, as apparent to those skilled in the art. The pixel color information is then outputted to VRAM for real-time rendering of the type one vector data on the display 50a.

In general, real-time rendering of type one vector data, as described above, aims to fill the triangles 910 along the stroke path to achieve sequential rendering of the stroke in the same order as it is hand-drawn by the user. For example, referring back to the type one stroke object 21 of FIG. 2, as the user hand-draws the type one stroke object 21 from the "Pen down" point to the "Pen up" point, the user can observe real-time rendering of the stroke that starts at the "Pen down" point and grows continuously to terminate at the "Pen up" point on the display 50a. As such, the real-time rendering approach entails overdrawing (over coloring) of the triangles 910 at any self-intersecting portions of the stroke, such as the self-intersection 21a in FIG. 2. The real-time rendering approach permits overdrawing of the triangles 910 in favor of full hardware acceleration permitted by the graphics processing unit 40, as described above. In some embodiments, a suitable blending function may be applied to prevent any visual artifacts that may be caused by overdrawing of the triangles 910, as will be apparent to those skilled in the art.

In view of the potential inefficiency due to overdrawing at self-intersecting portions, however, the embodiments of the present invention propose to prepare, based on type one vector data, type two vector data which does not include any self-intersection and thus does not suffer from inefficiency due to overdrawing of the triangles 910. The type two vector data generator 430 as shown in FIG. 4 may be used to generate such type two vector data based on type one vector data generated by the type one vector data generator 410. Thus, either type one vector data or type two vector data may be selectively outputted depending on a particular output request, so as to take full advantage of both the benefit of type one vector data and the benefit of type two vector data.

Referring back to FIG. 2, the type two stroke object 23, which is generated based on the type one stroke object 21 including self-intersection 21a, consists of two shapes 23a and 23b each including no self-intersection. The process of converting a type one stroke object into a type two stroke object will be described below in reference to FIGS. 4 and 10A-14B.

Referring back to FIG. 4, the type two vector data generator 430 receives type one vector data from the memory device 450, wherein type one vector data (or "Curve Data") includes type one stroke objects each consisting of a set of point objects (P1-Pn). The type two vector data generator 430 generates type two vector data based on the received type one vector data, and outputs the generated type two vector data (or "Boundary" data (V1-Vm)) to the memory device 450. The selector 460 may then be used to selectively output type one vector data, type two vector data, or raw pen event data, all stored in the memory device 450, depending on a particular output request.

Figure 10A:
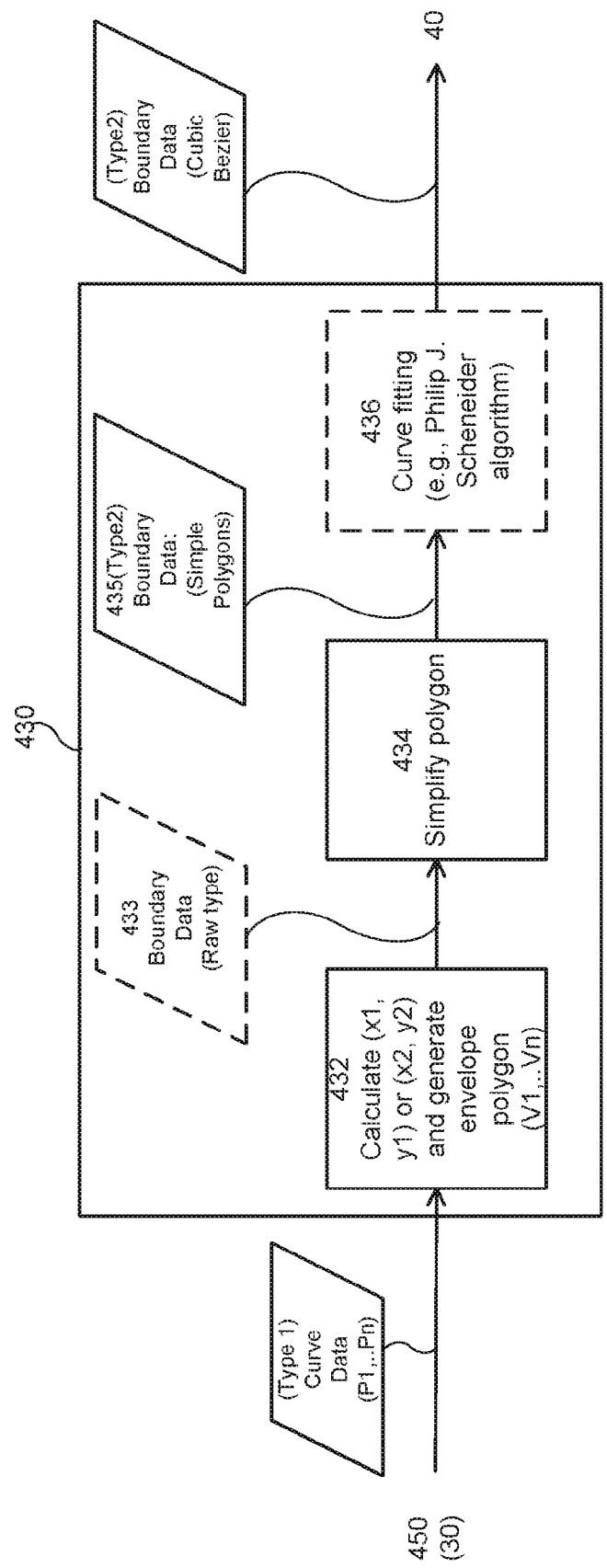
FIG. 10A is a functional block diagram of the type two vector generator (the type one to type two converter) of FIG. 4.

FIG. 10A is a functional block diagram of the type two vector data generator 430 (the type one to type two converter). The type two vector data generator 430 receives type one vector data (or "Curve Data" (P1-Pn)) from the memory device 450. As will be fully described below, various embodiments of the invention convert type one vector data usable with Catmull-Rom interpolation to type two vector data usable with cubic Bezier interpolation, which is one of the most common interpolation methods used in computer graphics.

In operation block 432 of FIG. 10A, the type two vector data generator 430 segments each of the curve segments (e.g., Catmull-Rom Curve segments) forming a type one stroke object by "boundary points" between two control points that define the curve segment. In this connection, the operation in block 432 of FIG. 10A is similar to the operation of finding division points as described above in reference to FIG. 8.

Specifically, in block 432 of FIG. 10A, the boundary points may be calculated, per each curve segment, taking into consideration, for example, pixel resolution of the display 50a, contour/shape of the type one stroke object, etc. For example, the display pixel resolution may be considered to determine the optimal number and positions of the boundary points to be placed along each curve segment of the type one stroke object to achieve realistic rendition of the stroke on the display 50a. The resulting boundary points include and reuse the original control points (P1-Pn) defined for the type one stroke object as inputted, and additionally include filler points added to achieve a desired level of pixel resolution when the resulting type two stroke object is rendered. For example, filler points may be added as boundary points to minimize the distance between the curve segments defined by the added filler points and the actual stroke's contours, for example, to be less than a certain pixel-size based threshold, although, unlike in the case of "division points" described above, the threshold may be relaxed in block 432 where high-resolution display typically required in connection with real-time rendering is not required. Also, in block 432, after the boundary points are determined, a suitable smoothing algorithm may be applied to smooth out the boundary points. The resulting boundary points, including the original control points and the added filler points, are then used as new control points to define curves such as the cubic Bezier curves. Block 432 of FIG. 10A, similar to boxes 421 and 422 of FIG. 8, produces two sets of (left and right) envelope points $(x_1, y_1)$ and $(x_2, y_2)$, which collectively form outline curves 908a and 908b, which together envelop the stroke. As before, two points $(x_1, y_1)$ and $(x_2, y_2)$ are produced for each of the boundary points.

The resulting boundary points data, including the left and right envelope points calculated for each of the boundary points, may be optionally stored as "boundary data" of raw type, as shown in block 433. As in the case of the division points discussed above, each of the boundary points and its associated "left" and "right" point may be associated with attribute information, such as color and transparency values, which may be derived from the color and transparency values of the original control points (P1-Pn) based on which the boundary points were found.

In operation block 434, the type two vector data generator 430 simplifies the stroke enveloped by the two sets of points $(x_1, y_1)$ and $(x_2, y_2)$ along the two outline curves 908a and 908b into one or more simple polygons (or simple shapes), which form a type two stroke object as in block 435, according to exemplary embodiments of the invention. For example, block 434 simplifies the type one stroke object 21 including self-intersection 21a as shown in FIG. 2 into a type two stroke object 23 consisting of two simplified shapes 23a and 23b each including no self-intersection as also shown in FIG. 2.

Various polygon clipping algorithms are known, which are suitable for clipping a given shape into one or more simple polygons including no self-intersection. Such algorithms include, as non-limiting examples, the Vatti polygon clipping algorithm disclosed in Bala R. Vatti, "A generic solution to polygon clipping," *Communications of the ACM*, Vol. 35, Issue 7 (July 1992) pp. 56-63, and the Greiner-Hormann clipping algorithm, well known in the art. In particular, the Vatti clipping algorithm provides a highly general solution capable of clipping any concave, convex and self-intersection shapes to produce non-self-intersecting polygons and, as such, is highly suitable for use in various embodiments of the present invention.

Figure 10B:
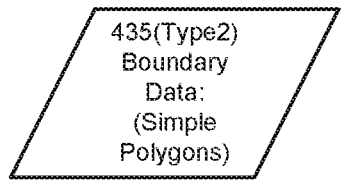
FIG. 10B illustrates a sample boundary data (simple polygon) produced by the type two vector generator of FIG. 10A, before curve fitting is applied.
Figure 10B:
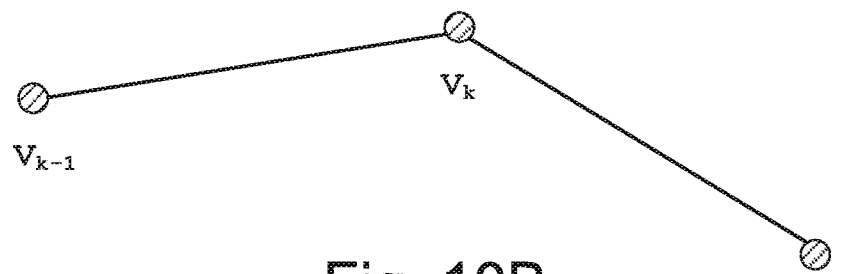

The resulting type two stroke object is a simple polygon defined by a set of segments which are in turn defined by boundary points $V_{k-1}, V_k, V_{k+1}$, as shown in FIG. 10B. FIG. 10B illustrates a sample boundary data (simple polygon) produced by the operation block 434 in FIG. 10A, before curve fitting 436 is applied. The type two stroke object may be outputted as a collection of the segments defined by the boundary points as shown in FIG. 10B.

Optionally, in operation block 436 of FIG. 10A, a suitable curve fitting algorithm may be applied to the simple polygons 435 of FIG. 10B, such as the Philip J. Schneider algorithm as well known in the art. In some embodiments, a curve fitting may be previously applied in block 432, for example, and in such case additional curve fitting in block

436 may not be necessary. In various embodiments, boundary points that are particularly designed to facilitate accurate reproduction of the original shape of a hand-drawn stroke upon rendering may be added, such as boundary points added at corners 21*b* of a shape of the stroke as shown in FIG. 2.

Figure 10C:
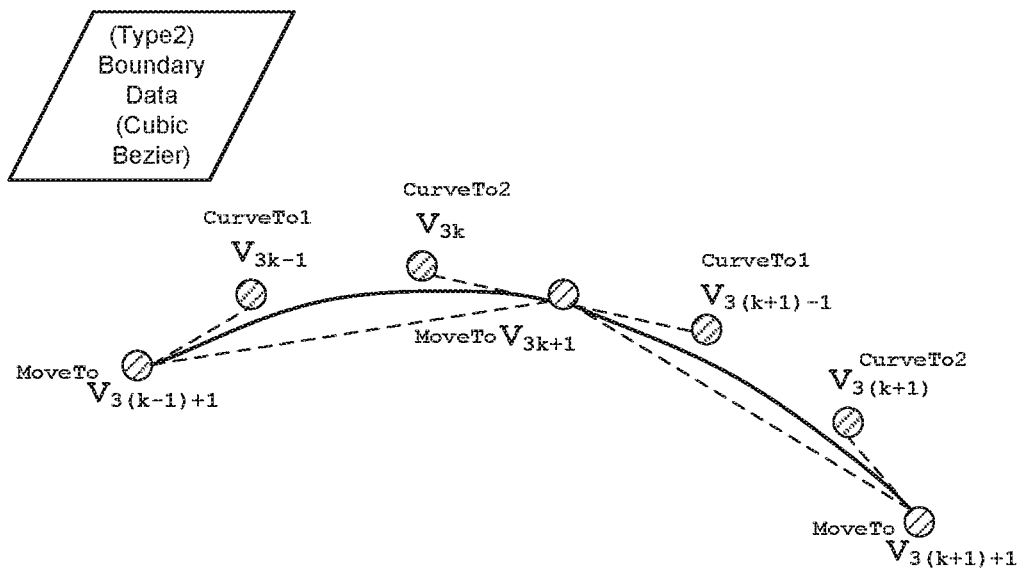
FIG. 10C illustrates a sample boundary data (cubic Bezier) produced by the type two vector generator of FIG. 10A and to which curve fitting has been applied.

FIG. 10C illustrates a sample boundary data (cubic Bezier), to which curve fitting has been applied in operation box 436 of FIG. 10A. FIG. 10C illustrates that the boundary of the stroke is defined by a set of Bezier curves, which are in turn defined by boundary points $V_{3k+1}$, $V_{3(k+1)+1}$, $V_{3(k+2)+1}$ functioning as control points for the Bezier curves. Any type of Bezier curves, including a quadratic Bezier curve and any high-order Bezier curve such as a cubic Bezier curve may be used. In the example of FIG. 10C, two cubic Bezier curves are used to define the boundary of the stroke, where each cubic Bezier curve is defined by four control points. The first Bezier curve is defined by control points $V_{3(k-1)+1}$, $V_{3k-1}$ ("CurveTo1" point), $V_{3k}$ ("CurveTo2" point), $V_{3k+1}$. The second Bezier curve is defined by control points $V_{3k+1}$, $V_{3(k+1)-1}$ ("CurveTo1" point), $V_{3(k+1)}$ ("CurveTo2" point), $V_{3(k+1)+1}$. As apparent from comparison with FIG. 10B above, per each segment, two additional control points, termed "CurveTo1" and "CurveTo2" points, are added to more closely follow and define the contour of the boundary of the stroke. Briefly, a cubic Bezier curve is a Bezier curve of degree 3 and is defined by 4 control points ($P_0$, $P_1$, $P_2$ and $P_3$). The curve starts at $P_0$ and stops at $P_3$. The line $P_0P_1$ is the tangent of the curve at point $P_0$, and the line $P_2P_3$ is the tangent of the curve at point $P_3$. $P_0$ is termed a "MoveTo" point, to indicate the starting point of a Bezier curve. In general, the Bezier curve will not pass through $P_1$ or $P_2$; the function of these points is to provide directional information. The distance between $P_0$ ("MoveTo" point) and $P_1$ determines "how long" the curve moves into direction $P_1$ before turning towards $P_3$ and, thus, $P_1$ and $P_2$ are called "CurveTo" points. In various embodiments, the type two stroke object may be outputted (exported) as a collection of Bezier curves defined by control points (provided by the boundary points in the illustrated embodiment) as shown in FIG. 10C.

In the example of FIG. 2, the type two stroke object 23 consists of two simple shapes 23*a* and 23*b*, wherein each of the simple shapes is defined by boundary points V1-V10 and V1-V6, respectively. The two sets of boundary points serve as control points to form Bezier curves, which form the exterior and interior boundaries of the stroke, respectively.

The type two vector data generator 430 thus completes generation of type two vector data including type two stroke objects, each being defined by a set boundary points, such as points V1-V10 of the simplified shape 23*a* and points V1-V6 of the simplified shape 23*b* in FIG. 2. The boundary points serve as control points to generate interpolated curves, which follow the contours of the simplified shapes 23*a* and 23*b*, using, for example, the cubic Bezier interpolation algorithm. The generated type two vector data may then be exported as a computer-readable file, such as a Scalable Vector Graphics (SVG) file, containing a set of Bezier curves each defined by control points, as will be more fully described below in reference to FIGS. 17A-17C. Alternatively or additionally, the generated type two vector data may be inputted to a 2D graphics library coupled to the graphics processing unit 40 (FIG. 4) for rendering. Still alternatively or additionally, the generated type two vector data may be stored in the memory device 450 to be later selectively outputted or exported by the selector 460 in response to an output request.

As shown in FIG. 2, the simplified shapes 23*a* and 23*b* that together form the type two stroke object 23 are defined by the boundary points V1-V10 and V1-V6, respectively, which do not coincide with the sequential order in which the original stroke was hand-drawn. This is in contrast to the type one stroke object 21, also shown in FIG. 2, which is defined by the division points P1-P8 that are in the same sequential order in which the original stroke was hand-drawn. As such, the type two stroke object 23 in the illustrated embodiment is typically incapable of being reproduced in the same sequential order as how the original stroke was hand-drawn. However, because the type two stroke object consists of simple shapes that do not include any self-intersection, it is free of the inefficiency due to over-drawing of triangles 910 (see FIG. 9D) associated with the type one stroke object 21. This makes type two vector data highly efficient, in particular for the purpose of bulk rendering in which a (large) number of type two stroke objects need to be rendered and manipulated (zoomed, rotated, scrolled, tilted, the rendering area changed, etc.) in bulk (see 440 Bulk Rendering of pre-existing strokes in FIG. 4).

Figure 11:
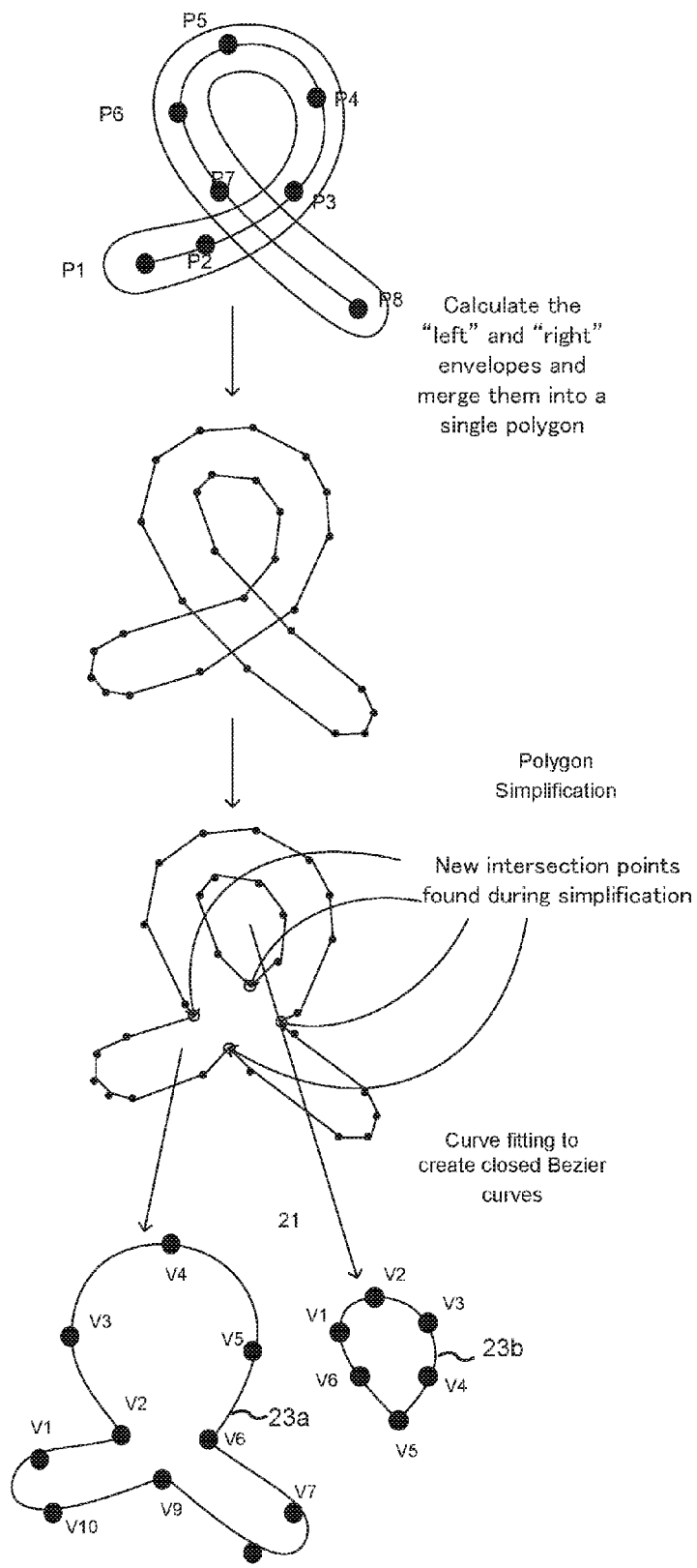
FIG. 11 is a schematic flow diagram illustrating conversion of a type one stroke object including self-intersection into a type two stroke object consisting of two shapes including no self-intersection.

FIG. 11 is a schematic flow diagram illustrating conversion of a type one stroke object including self-intersection into a type two stroke object consisting of two simplified shapes including no self-intersection.

Figure 12:
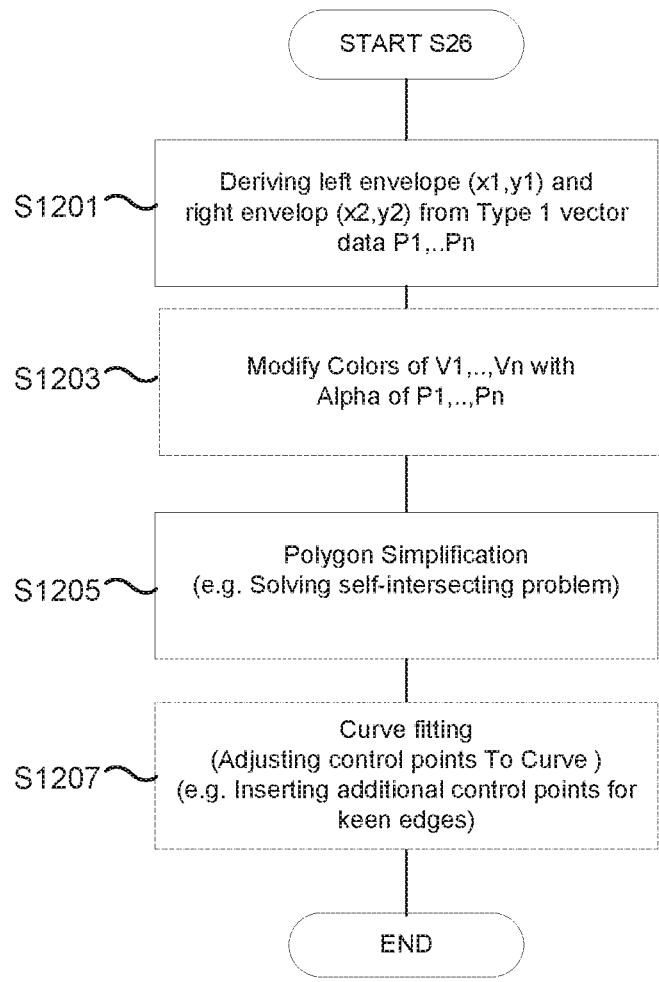
FIG. 12 is a flow chart illustrating a sample routine performed by the type two vector data generator of FIG. 10A.

FIG. 12 is a flow chart illustrating a sample routine performed by the type two vector data generator 430 of FIG. 10A. In step S1201, a received type one stroke object is segmented by boundary points, based on which two sets of points ($x_1$, $y_1$) and ($x_2$, $y_2$) for every boundary point are calculated to form two outline curves 908*a* and 908*b* that envelop the stroke. The resulting boundary points may include the original boundary points as well as the left and right envelope points calculated based on the original boundary points. In step S1203, optionally, with respect to the boundary data of raw type (see block 433 in FIG. 10A) wherein each boundary point V1, . . . Vn is associated with both a color value and a transparency (alpha) value, the color value of each boundary point (and of the left and right points of each boundary point) is adjusted using the transparency value of the same boundary point, which will be useful when embedding the generated type two vector data into a PDF file, as will be more fully described below in reference to FIGS. 13-14B.

In step S1205, polygon simplification is performed to simplify the type one stroke object into a type two stroke object consisting of one or more polygons each including no self-intersection. Each of the simple polygons is defined by a set of boundary points, which may be used as control points for generating segments, as shown in FIG. 10B. In step S1207, optionally, curve fitting may be applied and the boundary points may be adjusted (e.g., smoothed, or additional boundary points added to any corners of the simplified shapes). As a result, for example, interpolation curves using a suitable interpolation algorithm such as cubic Bezier interpolation are generated, to define the boundary of the stroke represented by the type to stroke object.

Figure 13:
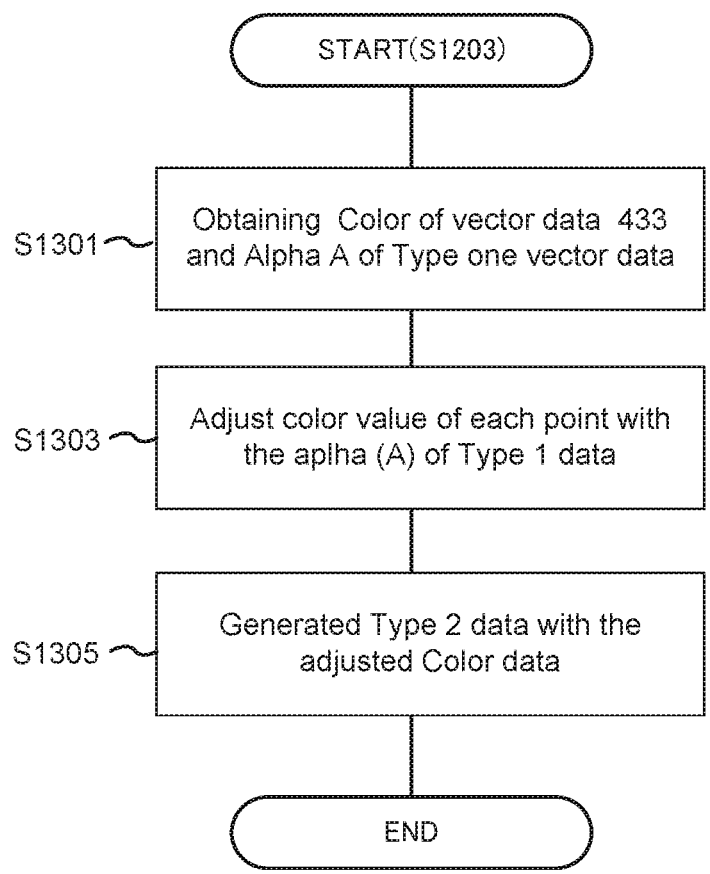
FIG. 13 is a flow chart illustrating a method of generating type two vector data, by adjusting their color values based on transparency values of the original type one vector data, to be embedded in a PDF file.

FIG. 13 is a flow chart illustrating a routine to process the boundary data of raw type (see block 433 in FIG. 10A) to generate type two vector data suited to be embedded in a PDF file. In step S1301, the routine receives pairs of points ($x_1$, $y_1$) and ($x_2$, $y_2$), each associated with color and transparency values, which are the left and right points of the boundary points. As discussed above, the color and transparency values of the points ($x_1$, $y_1$) and ($x_2$, $y_2$) based on the boundary points may be derived from the color and transparency values of the type one vector data (e.g., P1-Pn) used as an input for generating type two vector data.

Some applications, such as a PDF application, do not support a transparency value for each point being processed. Thus, in step S1303, the routine adjusts the color value of each (left and right) point by the alpha value of the same point to thereby incorporate or embed the transparency information into the color value alone. In step S1305, the routine outputs type two vector data wherein each boundary point, and hence its left and right points, is associated with an adjusted color value, which is a combination of, and thus is representative of, the original color value and the original transparency value.

Figures 14A, 14B:
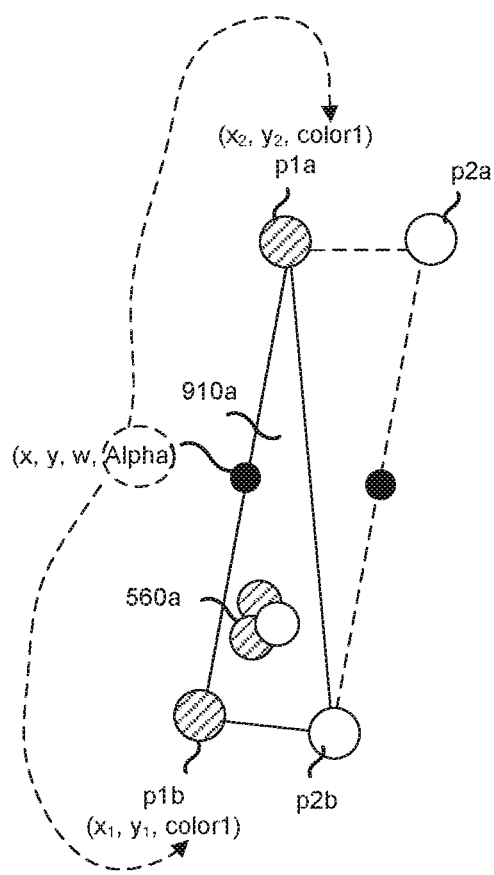
FIGS. 14A and 14B are schematic diagrams illustrating the method of generating type two vector data as in FIG. 13.

FIGS. 14A and 14B schematically illustrate the process of generating type two vector data having adjusted color values, as described above in reference to the flow chart of FIG. 13. In the illustrated example, a first pair of points p1a and p1b and a second pair of points p2a and p2b correspond to the boundary data of raw type 433 (in FIG. 10A), wherein each of the points p1a, p1b, p2a and p2b is defined by its XY coordinates and is associated with a color value and a transparency value (alpha). Typically, each pair of points has the same color and transparency values. For example, color and transparency values of points p1a and p1b based on a first boundary point (a black circle) are the same (as the color and transparency values of the first boundary point), and color and transparency values of points p2a and p2b based on a second boundary point are the same (as the color and transparency values of the second boundary point).

In step S1303 of FIG. 13, a color value of each of the points may be adjusted as follows:

Adjusted color=color+(1−alpha)*(1−color)  (Eq. 4)

Such adjustment typically results in an adjusted color that is whiter than the original color, assuming that background color is white ("FFFFFF"), resulting in improved blending of colors when rendered on a display.

In FIG. 14B, reference numeral 1401 indicates that the first three lines of data defining points p1a, p1b and p2a form one triangle formed by these three points as vertices. When the color values of points p1a, p1b and p2a are adjusted, as described above, a color of (or a color within) the triangle 560a (see FIG. 14A) may be automatically calculated by PDF "ShadingType4 (Free-Form Gouraud-Shaded Triang meshes," for example.

Figure 15:
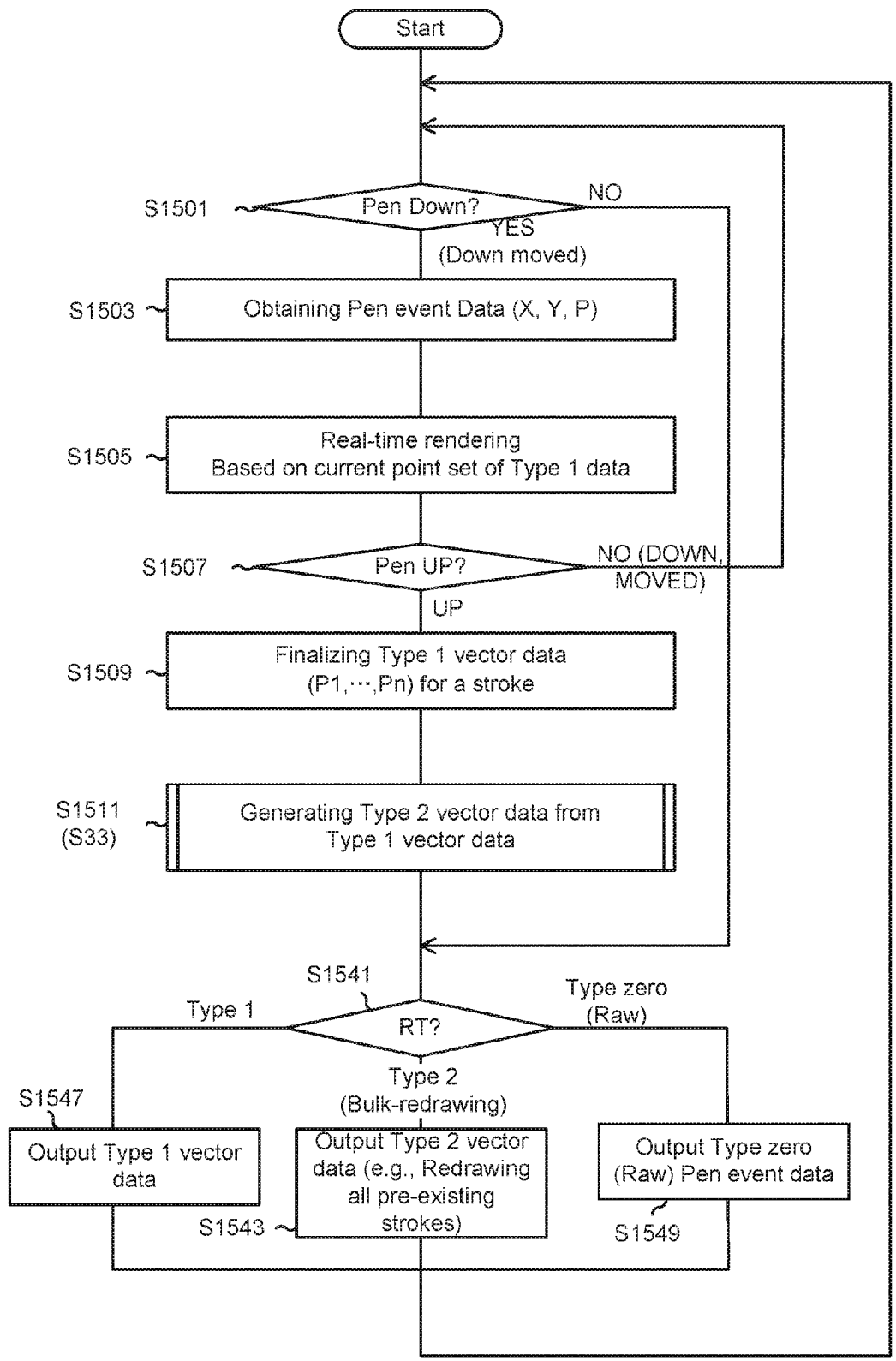
FIG. 15 illustrates a process of selectively outputting type one vector data, type two vector data, or type zero data (raw pen event data) depending on an output request.

FIG. 15 is a flow chart illustrating a detailed routine of selectively outputting type one vector data, type two vector data, or type zero data (raw pen event data) depending on an output request.

In step S1501, a pen down event on the position input sensor 50 is detected. When a pen down event is detected, in step S1503, pen event data, (X, Y, P) for example, is obtained. In step S1505, the type one vector data generator 410 generates type one vector data based on the received pen event data, and the real-time renderer 420 starts real-time output of the generated type one stroke object (as it is being built from its pen-down point) without waiting for completion of the type one stroke object at is pen-up point. In step S1507, a pen up event is detected. If no, it means that the user's pen input operation continues and that the pen is down and moved on the position input sensor 50 and, thus, the routine returns to step S1501 to continue cycling through steps S1503-S1507.

In step S1507, if a pen up event is detected, it means that the user's input of a stroke has been completed (at its pen-up point). Then, in step S1509, the routine finalizes the type one stroke object, which represents the stroke from its pen-down point to the pen-up point, and may store the finalized type one stroke object in the memory device 450 (see FIG. 4).

In step S1511, the type two vector data generator 430 generates type two vector data based on the type one vector data finalized in step S1509 above, and stores the generated type two vector data in the memory device 450.

In step S1541, a type of an output request ("RT") received from an application 300 (see FIG. 1B) being executed is determined.

Figure 16B:
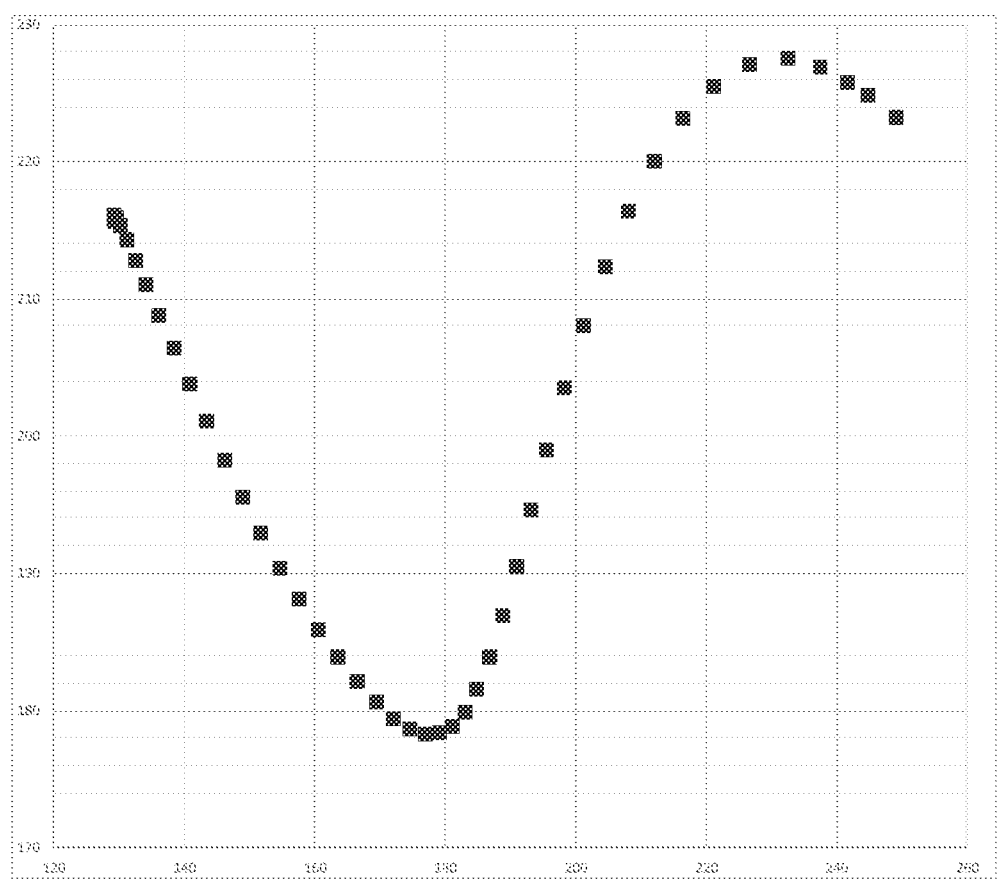
FIG. 16B is a sample result of rendering the set of point objects defining the type one stroke object of FIG. 16A.

If an output request (RT) is for type one vector data, in step S1547, type one vector data as stored in the memory device 450 is outputted. FIG. 16A illustrates a sample computer-readable file including the type one vector data, which may be outputted or exported. The file includes a set of point objects $P_n$ defined by their coordinates $(X_n, Y_n)$ respectively associated with width information $(W_n)$ to collectively define the stroke represented by the type one stroke objet. Total 50 point objects $(P_0 \sim P_{49})$ are defined, with varying width (1.1~2) along the stroke, in the sample file of FIG. 16A. FIG. 16B is a sample result of rendering the set of point objects $P_0 \sim P_{49}$ of FIG. 16A on a display. The form in which the type one data is outputted or exported is not limited to be as a file, and may be as streaming binary data.

Output requests for type one vector data may include, for example, an output request from a text (character) recognition application, a signature verification application, a machine control application, and, more generally, any output request for ink data that can be rendered (reproduced) in the same order as how the stroke was initially inputted.

Figure 17B:
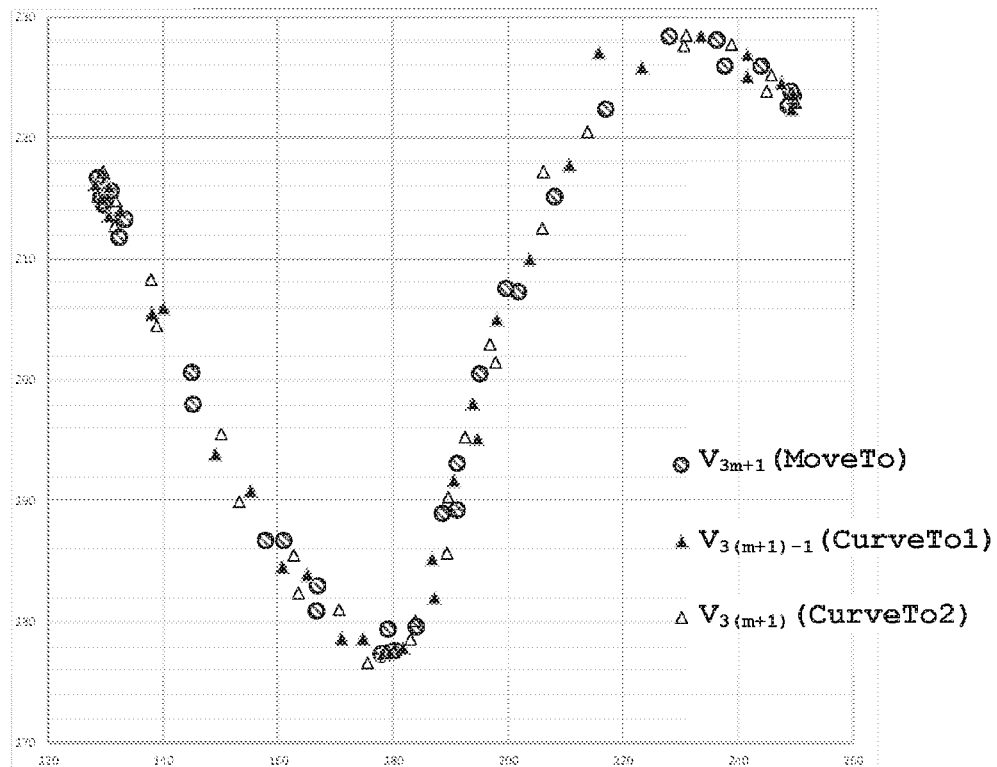
FIG. 17B illustrates control points of the Bezier curves as rendered.
Figure 17C:
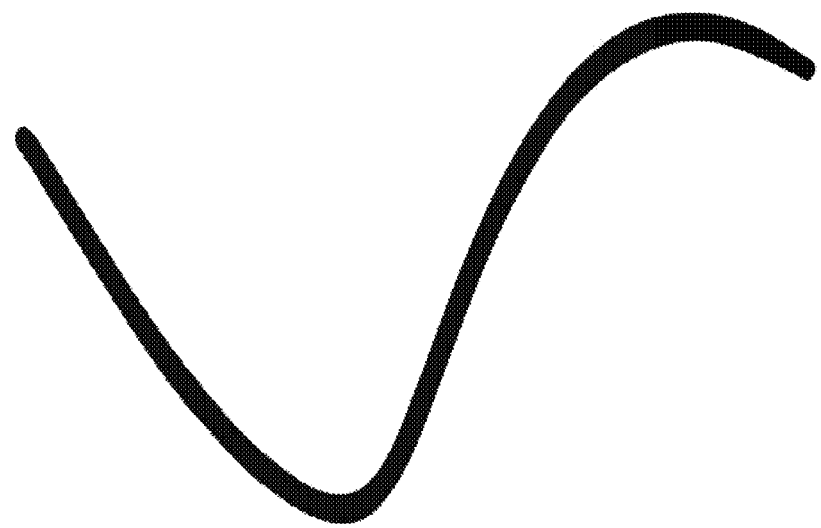
FIG. 17C is a sample result of rendering the Bezier curves based on the control points.

If an output request (RT) is for type two vector data, in step S1543, type two vector data, which may be stored in the memory device 450, is outputted or exported. Output requests for type two vector data may include, for example, an output request for bulk rendering involving zooming, rotating, tilting, or changing a rendering area of a set of strokes in bulk, and an output request to have the ink vector data embedded in a PDF file. FIG. 17A illustrates a sample computer-readable file including the type two vector data, which may be outputted or exported. The file includes a set of cubic Bezier curves (m=0~32) each defined by four control points. As illustrated in FIG. 10C above, the first control point (e.g., $V_{3k+1}$ in FIG. 10C) of a cubic Bezier curve ($V_{3k+1}$ to $V_{3(k+1)+1}$) coincides with the fourth control point of an immediately preceding Bezier curve ($V_{3(k-1)+1}$ to $V_{3k+1}$). In other words, two adjacent cubic Bezier curves share one control point. Thus, in the sample file of FIG. 17A, the Bezier curves are each explicitly defined by three control points—the first ($V_{3m-1}$), second ($V_{3m}$) and third ($V_{3m+1}$) control points and implicitly defined by the third ($V_{3m+1}$) control point of the immediately preceding Bezier curve, to eliminate redundancy and to reduce the file size. For example, the first Bezier curve (m=1) is defined by its three control points ($V_{3m-1}$), ($V_{3m}$), ($V_{3m+1}$) and the third ($V_{3m+1}$) control point of the immediately preceding Bezier curve (m=0); the second Bezier curve (m=2) is defined by its three control points ($V_{3m-1}$), ($V_{3m}$), ($V_{3m+1}$) and the third ($V_{3m+1}$) control point of the immediately preceding Bezier curve (m=1); and so forth. In various exemplary embodiments, the computer-readable file including the type two vector data may be a Scalable Vector Graphics (SVG) file. FIG. 17B illustrates the control points of the Bezier curves as rendered. The first ($V_{3m+1}$) "MoveTo" control points, the second ($V_{3(m+1)-1}$) "CurveTo1" control points, and the third ($V_{3(m+1)}$) "CurveTwo2" control points are shown as visually distinguishable from each other. The control points collectively follow the boundary of the stroke originally represented by the type one stroke object (see FIG. 16B). FIG. 17C is a sample result of rendering the type two stroke object of FIGS. 17A and 17B on a display (e.g., the interior of the boundary is filled out), which closely resembles the shape of the stroke originally represented by the type one stroke object.

The form in which the type two data is outputted or exported is not limited to be as a file, and may be as streaming binary data.

Alternatively or additionally to outputting or exporting the type two vector data as in a file or as streaming binary data, the type two vector data may be rendered on a display, as in FIG. 17C.

If an output request (RT) is for type zero data (raw pen event data), in step S1549, raw pen event data (e.g., "X, Y, P") as stored in the memory device 450 is outputted. Output request for type zero data may include, for example, an output request from a signature verification application.

It should be appreciated by those skilled in the art that each of the elements, devices, steps and processes described above may be combined with other elements, devices, steps and processes, or may be further divided into sub-elements, sub-devices, sub-steps and sub-processes, depending on each implementation and application. Still further, the steps and processes may be executed in a single processor, or may be distributedly executed in multiple processors, depending on each implementation and application.

The invention claimed is:

1. A computer-implemented method of selectively outputting two types of vector data representative of user-input strokes, comprising:
   generating type one stroke objects in a device including a position input sensor, wherein the type one stroke objects represent strokes formed by a user operating a pointer relative to the position input sensor, and each type one stroke object represents a stroke starting at a pen-down time at which the pointer is detectably placed relative to the position input sensor and ending at a pen-up time at which the pointer is removed from the position input sensor;
   starting real-time rendering of a type one stroke object after the pen-down time of a stroke represented by said type one stroke object without waiting for completion of the stroke at the pen-up time;
   after completion of a type one stroke object representative of a stroke from its pen-down time to its pen-up time, converting the type one stroke object to a type two stroke object, wherein the type two stroke object is a set of segments defining a boundary of the stroke; and
   exporting the type two stroke object in response to an output request.

2. The computer-implemented method of claim 1, wherein the step of generating type one stroke objects includes:
   sequentially receiving pen event data detected by the position input sensor;
   sequentially generating point objects based on coordinate values included in the received pen event data, wherein the point objects serve as control points for interpolating curve segments according to a defined curve interpolation algorithm to form a type one stroke object and wherein each point object is associated with width information; and
   generating a type one stroke object as a collection of the point objects that define a stroke represented by the type one stroke object.

3. The computer-implemented method of claim 2, wherein the width information is indicative of a radius of a point object for use in defining a width of a stroke represented by the type one stroke object.

4. The computer-implemented method of claim 2, wherein the step of starting real-time rendering of the type one stroke object includes:
   segmenting each curve segment of the type one stroke object into multiple division points i;
   applying the width information to each of the division points i to determine two outline curves forming the type one stroke object; and
   rendering the type one stroke object by rasterizing between the two outline curves.

5. The computer-implemented method of claim 4, wherein the division points i are in the same sequential order as a sequential order in which the stroke represented by the type one stroke object is user-inputted from the pen-down time to the pen-up time.

6. The computer-implemented method of claim 2, comprising:
   exporting the type one stroke objet as a computer-readable file including the point objects respectively associated with the width information.

7. The computer-implemented method of claim 1, wherein the step of converting the type one stroke object to the type two stroke object includes:
   using a clipping algorithm, simplifying a shape of the type one stroke object into one or more simplified shapes that do not include self-intersection, wherein each simplified shape is defined by boundary points and the segments formed between the boundary points; and
   outputting the one or more simplified shapes as the type two stroke object comprised of the set of segments defining the boundary of the stroke.

8. The computer-implemented method of claim 7, wherein the boundary points are not in the same sequential order as a sequential order in which the stroke represented by the type two stroke object is user-inputted from the pen-down time to the pen-up time.

9. The computer-implemented method of claim 7, wherein the type two stroke objet is exported as a computer-readable file including the set of segments defining the boundary of the stroke.

10. The computer-implemented method of claim 7, wherein the type two stroke object, whose boundary is curve-fitted, is exported as a computer-readable file including a set of Bezier curves as the set of segments defining the boundary of the stroke.

11. The computer-implemented method of claim 10, wherein each Bezier curve is a cubic curve defined by four control points and the first control point of a Bezier curve coincides with the fourth control point of an immediately preceding Bezier curve.

12. The computer-implemented method of claim 11, wherein the Bezier curves are each explicitly defined by its first, second and third control points and implicitly defined by the third control point of the immediately preceding Bezier curve.

13. The computer-implemented method of claim 10, wherein the computer-readable file is a Scalable Vector Graphics (SVG) file.

14. The computer-implemented method of claim 1, comprising:
   rendering the type two stroke object, which is exported, on a display.

15. The computer-implemented method of claim 14, wherein the rendering of the type two stroke object includes one or more of zooming, scrolling, and changing a rendering area of the stroke represented by the type two stroke object.

16. The computer-implemented method of claim 1, further comprising:
storing the type one stroke objects;
storing the type two stroke objects; and
selectively exporting one or both of the type one stroke objects and the type two stroke objects depending on an output request.

17. The computer-implemented method of claim 16, further comprising:
exporting the type one stroke objects in response to an output request from applications including a real-time drawing application and a text recognition application; and
exporting the type two stroke objects in response to an output request from applications including a bulk drawing application and a portable document format (PDF) application.

18. A system of selectively outputting two types of vector data representative of user-input strokes, comprising:
a memory device;
a processor coupled to the memory device, wherein the processor is configured to perform:
receiving pen event data from a position input sensor, the pen event data being representative of strokes formed by a user operating a pointer relative to the position input sensor, each stroke starting at a pen-down time at which the pointer is detectably placed relative to the position input sensor and ending at a pen-up time at which the pointer is removed from the position input sensor;
generating type one stroke objects based on the received pen event data, wherein the type one stroke objects represent the strokes, respectively;
starting real-time rendering of a type one stroke object after the pen-down time of a stroke represented by said type one stroke object without waiting for completion of the stroke at the pen-up time;
after completion of a type one stroke object representative of a stroke from its pen-down time to its pen-up time, converting the type one stroke object to a type two stroke object, wherein the type two stroke object includes a set of segments defining a boundary of the stroke; and
exporting the type two stroke object in response to an output request.

19. The system of claim 18, wherein the processor exports the type two stroke object as a computer-readable file including a set of Bezier curves as the set of segments defining the boundary of the stroke.

20. The system of claim 19, wherein the computer-readable file is a Scalable Vector Graphics (SVG) file.

* * * * *